US012033568B2

(12) United States Patent
Lim et al.

(10) Patent No.: US 12,033,568 B2
(45) Date of Patent: Jul. 9, 2024

(54) DISPLAY DEVICE OPERATED IN SINGLE FREQUENCY MODE AND MULTI-FREQUENCY MODE

(71) Applicant: Samsung Display Co., LTD., Yongin-si (KR)

(72) Inventors: Jaekeun Lim, Yongin-si (KR); Bon-Seog Gu, Yongin-si (KR); Sangan Kwon, Yongin-si (KR); Soon-Dong Kim, Yongin-si (KR); Jinyoung Roh, Yongin-si (KR); Hae-Kwan Seo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/142,237

(22) Filed: May 2, 2023

(65) Prior Publication Data

US 2023/0419882 A1 Dec. 28, 2023

(30) Foreign Application Priority Data

May 26, 2022 (KR) ........................ 10-2022-0064847

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01);
(Continued)

(58) Field of Classification Search
CPC ............. G09G 3/32; G09G 2300/0819; G09G 2300/0852; G09G 2310/0202; G09G 2310/08; G09G 2320/0233; G09G 2330/021; G09G 2300/0861; G09G 2310/067; G09G 2300/0842; G09G 2330/028
See application file for complete search history.

(56) References Cited

U.S. PATENT DOCUMENTS 8,901,936 B2 12/2014 Jin et al.
10,783,830 B1 * 9/2020 Lu ........................ G09G 3/3258
(Continued)

FOREIGN PATENT DOCUMENTS

KR 1020130104563 A 9/2013
KR 1020210019635 A 2/2021
KR 1020210152102 A 12/2021

*Primary Examiner* — Rodney Amadiz
(74) *Attorney, Agent, or Firm* — CANTOR COLBURN LLP

(57) ABSTRACT

A display device includes a display panel including a pixel including a pixel circuit and a light emitting element, a plurality of scan lines connected to the pixel circuit, an emission control line connected to the pixel circuit, and a data line connected to the pixel circuit. The pixel circuit includes a first capacitor connected to a first node and a second node opposite to the first node, a first circuit portion that includes a first transistor connected between the data line and the first node and a second transistor connected between the first transistor and the first node, and a second circuit portion connected to the second node and the light emitting element. Before the light emitting element emits light, a reference voltage is provided to a third node between the first transistor and the second transistor.

19 Claims, 17 Drawing Sheets

(52) U.S. Cl.
CPC . *G09G 2310/0202* (2013.01); *G09G 2310/08* (2013.01); *G09G 2320/0233* (2013.01); *G09G 2330/021* (2013.01)

(56) References Cited

U.S. PATENT DOCUMENTS

| | | | | |
|---|---|---|---|---|
| 11,386,844 | B2 | 7/2022 | Jeon et al. | |
| 2013/0241562 | A1* | 9/2013 | Jin | H10K 71/70 445/2 |
| 2014/0307010 | A1* | 10/2014 | Han | G09G 3/003 345/82 |
| 2015/0348464 | A1* | 12/2015 | In | G09G 3/2022 345/82 |
| 2017/0270853 | A1* | 9/2017 | Xiang | G09G 3/3258 |
| 2021/0384467 | A1 | 12/2021 | Park et al. | |

* cited by examiner

<MFM>

DISPLAY DEVICE OPERATED IN SINGLE FREQUENCY MODE AND MULTI-FREQUENCY MODE

This application claims priority to Korean Patent Application No. 10-2022-0064847 filed on May 26, 2022, and all the benefits accruing therefrom under 35 U.S.C. § 119, the content of which in its entirety is herein incorporated by reference.

BACKGROUND

The present invention relates to a display device whose display quality is improved.

Among display devices, an emissive display device displays an image by using a light emitting element configured such that light is generated due to recombination of electrons and holes. The emissive display device has advantages of having fast response speed and being driven with low power consumption. The display device includes a display panel that displays an image, a scan driver that sequentially supplies signal signals to scan lines provided on the display panel, and a data driver that supplies data signals to data lines provided on the display panel.

SUMMARY

The present invention provides a display device whose display quality is improved.

According to an embodiment of the present invention, a display device includes: a display panel including a plurality of pixels, where each of the plurality of pixels includes a pixel circuit and a light emitting element, a plurality of scan lines connected to the pixel circuit, an emission control line connected to the pixel circuit, and a data line connected to the pixel circuit. The pixel circuit includes: a first capacitor connected to a first node and a second node opposite to the first node; a first circuit portion including a first transistor and a second transistor, the first transistor being connected between the data line and the first node, and the second transistor being connected between the first transistor and the first node; and a second circuit portion connected to the second node and the light emitting element. Before the light emitting element emits light, a reference voltage is provided to a third node between the first transistor and the second transistor.

In an embodiment, the first transistor may be a p-type thin film transistor. The second transistor may be an n-type thin film transistor.

In an embodiment, the first circuit portion may further include: a third transistor connected between the third node and a reference voltage line to which the reference voltage is provided; and a second capacitor connected between the first node and a first drive voltage line to which a first drive voltage is applied.

In an embodiment, the second circuit portion may include: a fourth transistor connected between the second node and a first initialization voltage line to which a first initialization voltage is applied; a fifth transistor connected between the fourth transistor and the first initialization voltage line; a sixth transistor including a gate electrode connected to the second node, a first electrode connected to the first drive voltage line, and a second electrode; a seventh transistor connected between the second electrode of the sixth transistor and a node between the fourth transistor and the fifth transistor; an eighth transistor connected between the light emitting element and the second electrode of the sixth transistor; and a ninth transistor connected between a node between the light emitting element and the eighth transistor and a second initialization voltage line to which a second initialization voltage is applied. The light emitting element may be connected between the eighth transistor and a second drive voltage line to which a second drive voltage is applied.

In an embodiment, each of the third, fifth, sixth, seventh, eighth, and ninth transistors may be a p-type thin film transistor. The fourth transistor may be an n-type thin film transistor.

In an embodiment, the second transistor and the fourth transistor may be controlled by same scan signal.

In an embodiment, before the eighth transistor is turned on, the reference voltage may be provided to the third node between the first transistor and the second transistor.

In an embodiment, the display panel may be configured to operate in a single frequency mode or a multi-frequency mode. In the multi-frequency mode, a first portion of the display panel may operate at a first frequency, and a second portion of the display panel may operate at a second frequency less than the first frequency.

In an embodiment, the plurality of pixels may include: a first pixel disposed in the first portion of the display panel; and a second pixel disposed in the second portion of the display panel. The second and fourth transistors of the second pixel disposed in the second portion may be turned off in the multi-frequency mode.

In an embodiment, the first transistor of the second pixel disposed in the second portion may be turned off in the multi-frequency mode.

In an embodiment, the second circuit portion may further include: a tenth transistor connected between the first drive voltage line and the first electrode of the sixth transistor; and an eleventh transistor connected between a node between the sixth transistor and the tenth transistor and a vias voltage line to which a bias voltage is provided.

In an embodiment, each of the tenth and eleventh transistors may be a p-type thin film transistor.

According to an embodiment of the present invention, a display device includes: a display panel including a first pixel and a second pixel spaced apart from the first pixel and, which is configured to operate in a single frequency mode or a multi-frequency mode. Each of the first pixel and the second pixel includes a pixel circuit and a light emitting element. The pixel circuit includes: a first capacitor connected to a first node and a second node; a first circuit portion including a first transistor and a second transistor, the first transistor being connected between a data line and the first node, and the second transistor being connected between the first transistor and the first node; and a second circuit portion connected to the second node and the light emitting element. In each of the single frequency mode and the multi-frequency mode, before the light emitting element emits light, a reference voltage is provided to a third node between the first transistor and the second transistor.

In an embodiment, the first circuit portion may further include: a third transistor connected between the third node and a reference voltage line to which the reference voltage is provided; and a second capacitor connected between the first node and a first drive voltage line to which a first drive voltage is applied.

In an embodiment, the second circuit portion may include: a fourth transistor connected between the second node and a first initialization voltage line to which a first initialization voltage is applied; a fifth transistor connected between the fourth transistor and the first initialization voltage line; a sixth transistor including a gate electrode connected to the second node, a first electrode connected to the first drive voltage line, and a second electrode; a seventh transistor connected between the second electrode of the sixth transistor and a node between the fourth transistor and the fifth transistor; an eighth transistor connected between the light emitting element and the second electrode of the sixth transistor; and a ninth transistor connected between a node between the light emitting element and the eighth transistor and a second initialization voltage line to which a second initialization voltage is applied.

In an embodiment, before the eighth transistor is turned on, the reference voltage may be provided to the third node between the first transistor and the second transistor.

In an embodiment, in the multi-frequency mode, a first portion of the display panel may operate at a first frequency, and a second portion of the display panel may operate at a second frequency less than the first frequency. The first pixel may be disposed in the first portion. The second pixel may be disposed in the second portion.

In an embodiment, the second and fourth transistors of the second pixel disposed in the second portion may be turned off in the multi-frequency mode.

In an embodiment, the first transistor of the second pixel disposed in the second portion may be turned off in the multi-frequency mode.

In an embodiment, the second circuit portion may further include: a tenth transistor connected between the first drive voltage line and the first electrode of the sixth transistor; and an eleventh transistor connected between a node between the sixth transistor and the tenth transistor and a vias voltage line to which a bias voltage is provided.

DETAILED DESCRIPTION

Figure 1A:
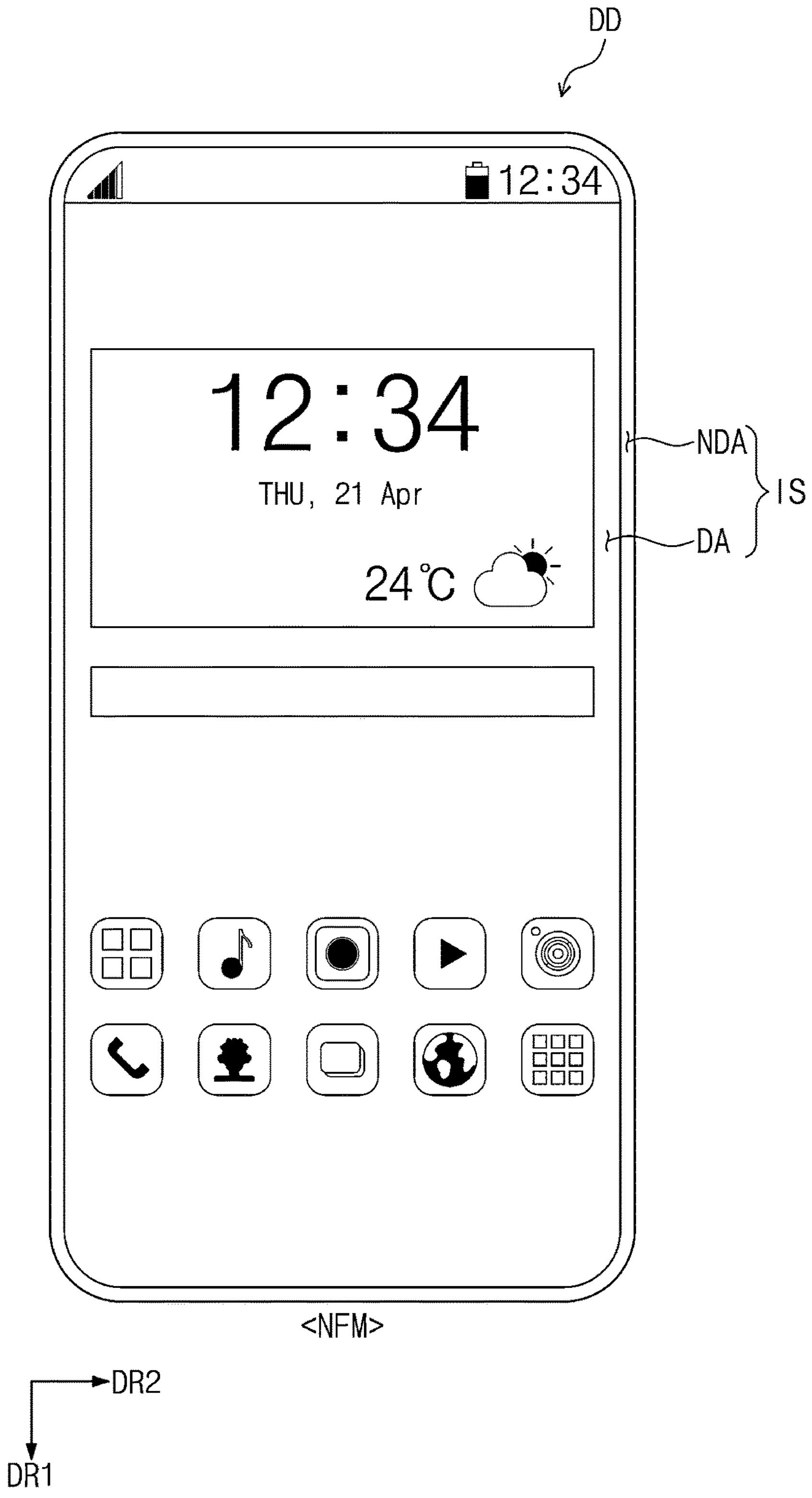
FIG. 1A illustrates a plan view showing a screen of a display device operated in a single frequency mode according to an embodiment of the present invention.

In this description, when a certain component (or region, layer, portion, etc.) is referred to as being "on", "connected to", or "coupled to" other component(s), the certain component may be directly on, directly connected to, or directly coupled to the other component(s) or at least one intervening component may be present therebetween.

Like numerals indicate like components. Moreover, in the drawings, thicknesses, ratios, and dimensions of components are exaggerated for effectively explaining the technical contents. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes one or more combinations defined by associated components. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," etc. may be used herein to describe various components, these components should not be limited by these terms. These terms are only used to distinguish one component from another component. For example, a first component could be termed a second component, and vice versa without departing from the scope of the present inventive concepts. Unless the context clearly indicates otherwise, the singular forms are intended to include the plural forms as well.

In addition, the terms "beneath," "lower," "above," "upper," and the like are used herein to describe one component's relationship to other component(s) illustrated in the drawings. The relative terms are intended to encompass different orientations in addition to the orientation depicted in the drawings.

It should be understood that the terms "comprise," "include," "have," and the like are used to specify the presence of stated features, integers, steps, operations, components, elements, or combinations thereof, but do not preclude the presence or addition of one or more other features, integers, steps, operations, components, elements, or combinations thereof.

Unless otherwise defined, all terms used herein including technical and scientific terms have the same meaning generally understood by one of ordinary skilled in the art. Also, terms as defined in dictionaries generally used should be understood as having meaning identical or meaning contextually defined in the art and should not be understood as ideally or excessively formal meaning unless definitely defined herein.

The following will now describe some embodiments of the present invention in conjunction with the accompanying drawings.

Figure 1B:
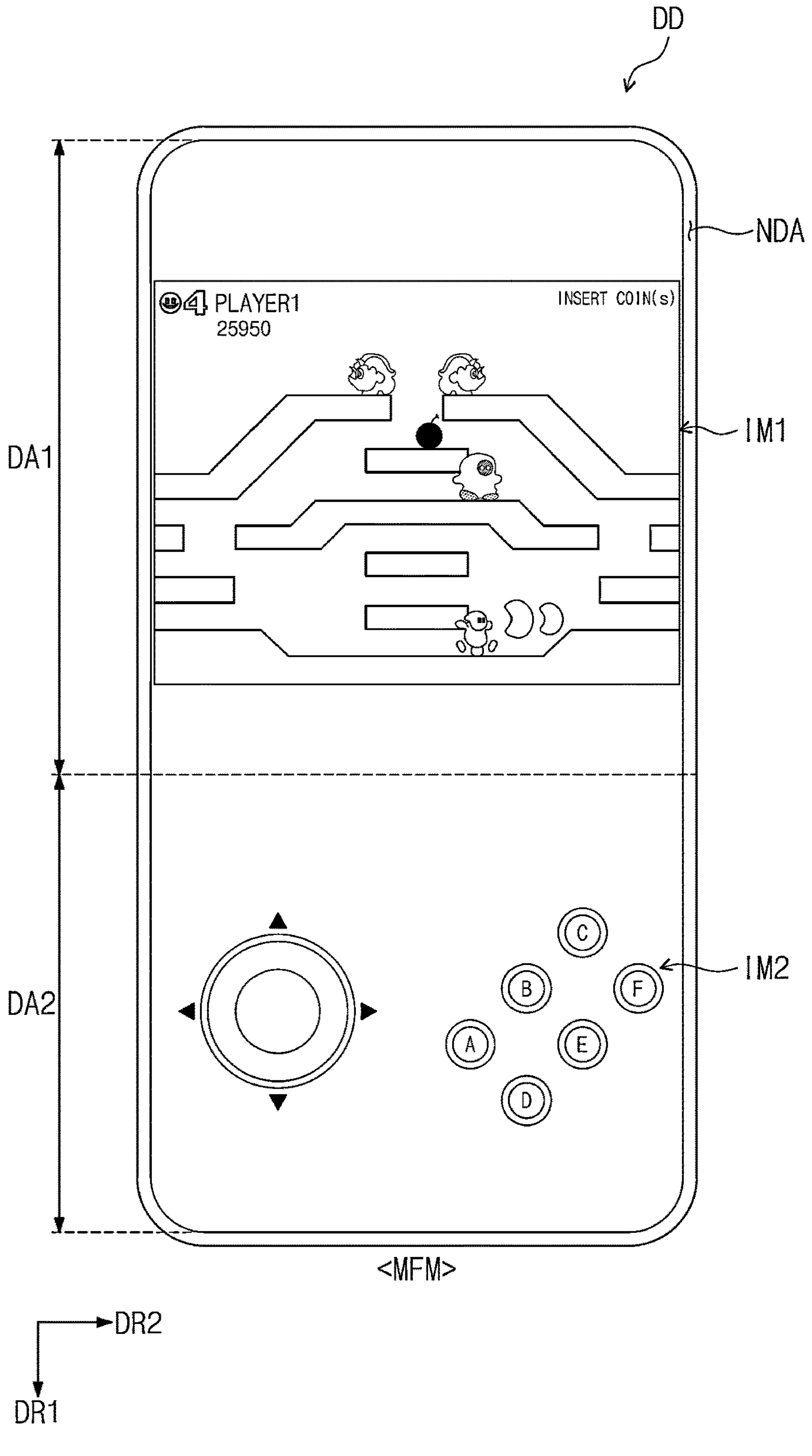
FIG. 1B illustrates a plan view showing a screen of a display device operated in a multi-frequency mode according to an embodiment of the present invention.
Figure 2A:
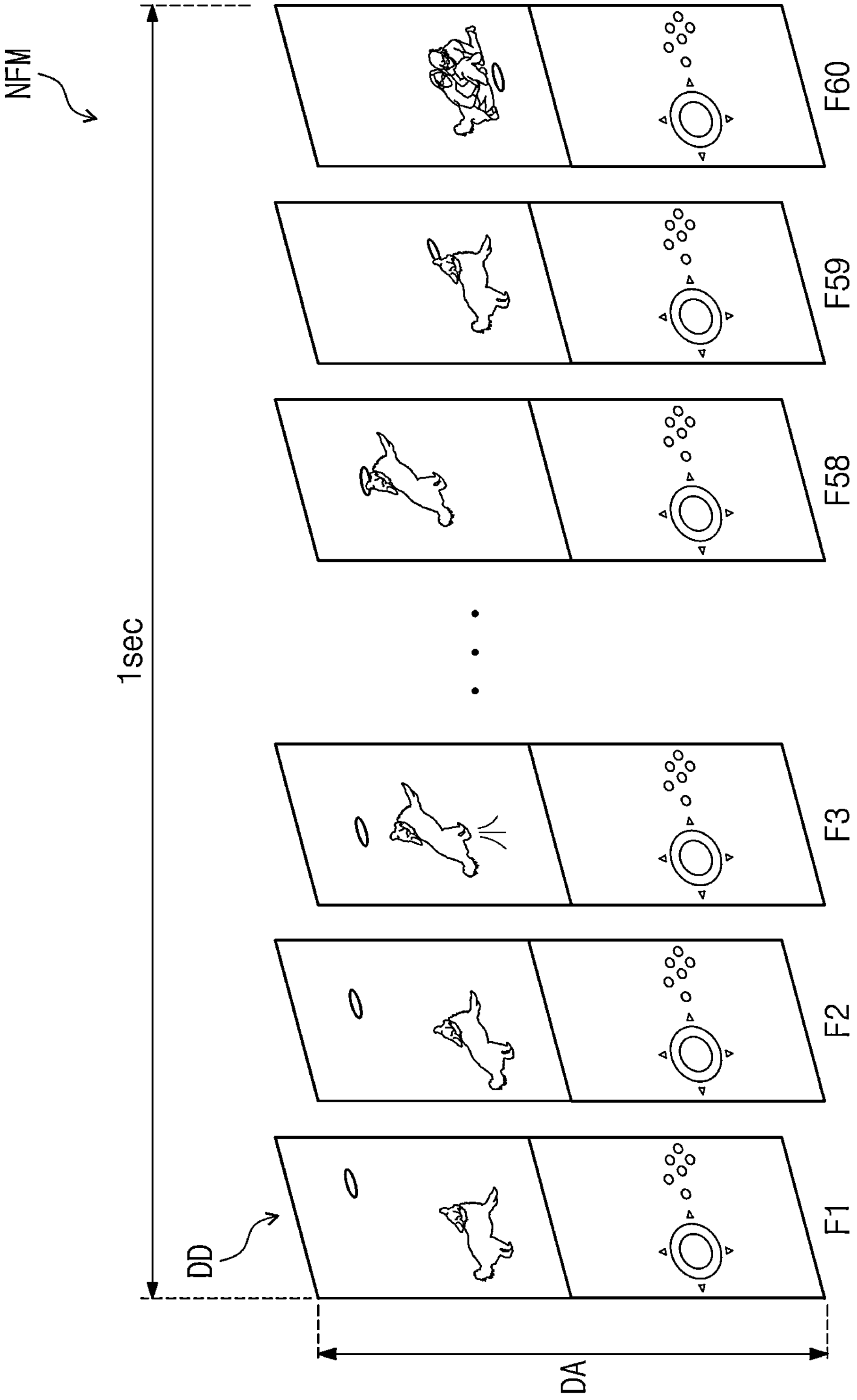
FIG. 2A illustrates a diagram showing an operation of a display device in a single frequency mode according to an embodiment of the present invention.
Figure 2B:
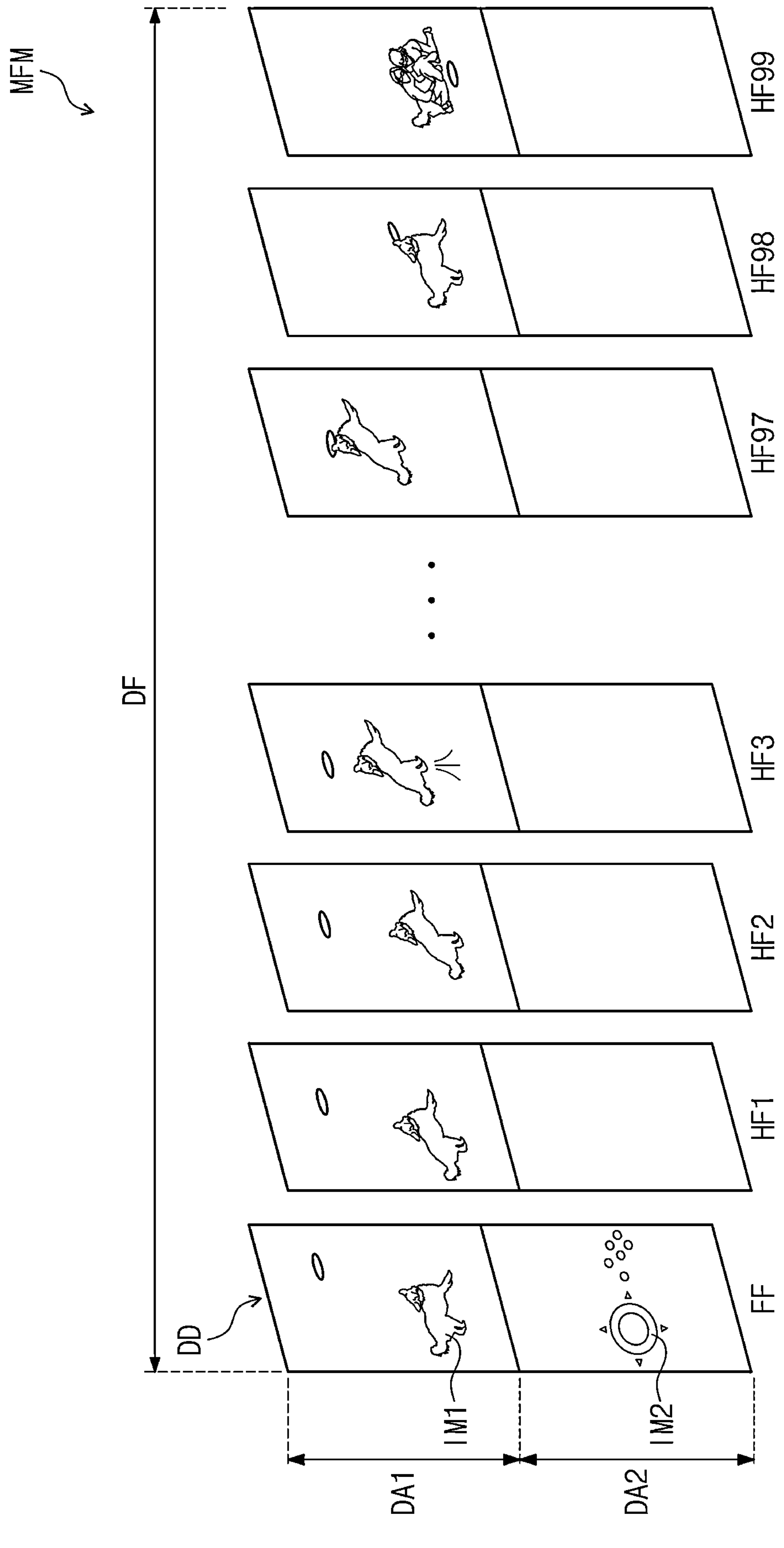
FIG. 2B illustrates a diagram showing an operation of a display device in a multi-frequency mode according to an embodiment of the present invention.

FIG. 1A illustrates a plan view showing a screen of a display device DD operated in a single frequency mode NFM according to an embodiment of the present invention. FIG. 1B illustrates a plan view showing a screen of a display device DD operated in a multi-frequency mode MFM according to an embodiment of the present invention. FIG. 2A illustrates a diagram showing an operation of a display device in a single frequency mode NFM according to an embodiment of the present invention. FIG. 2B illustrates a diagram showing an operation of a display device in a multi-frequency mode MFM according to an embodiment of the present invention.

Referring to FIGS. 1A and 1B, a display device DD may be an apparatus that is activated by electric signals. The display device DD may be applicable to an electronic apparatus, such as mobile phones, tablet computers, smart watches, laptop computers, desktop computers, and smart televisions.

The display device DD may display an image on a display surface IS parallel to each of first and second directions DR1 and DR2. The display surface IS that displays the image may correspond to a front surface of the display device DD. The image may include not only dynamic images but also static images.

The display surface IS of the display device DD may be divided into a display area DA and a non-display area NDA. The display area DA may be a region on which an image is displayed. A user recognizes an image through the display area DA. In an embodiment, the display area DA is illustrated as being of a rectangular shape with rounded vertices. This, however, is exemplarily illustrated, and the display area DA may have various shapes without being limited to a particular embodiment.

The non-display area NDA is adjacent to the display area DA. The non-display area NDA may have a certain color. The non-display area NDA may surround the display area DA. Thus, a shape of the display area DA may be substantially defined by the non-display area NDA. This, however, is exemplarily illustrated, and the non-display area NDA may be disposed adjacent only to one side of the display area DA, or may be omitted. The display device DD according to the present invention may include various embodiments and is not limited to particular embodiment.

Referring to FIGS. 1A, 1B, 2A, and 2B, the display device DD may display an image in a single frequency mode NFM, a multi-frequency mode MFM, or a variable frequency mode.

In the single frequency mode NFM, the display area DA of the display device DD is not divided into a plurality of display areas that have different drive frequencies. The display area DA may operate at one drive frequency in the single frequency mode NFM, and a single frequency may be defined to indicate a drive frequency of the display area DA in the single frequency mode NFM. For example, the single frequency may be about 60 Hertz (Hz). In the single frequency mode NFM, for one second (1 sec), the display area DA of the display device DD may display sixty images that correspond to a first frame F1 to a sixtieth frame F60. The present invention, however, is not limited thereto, and the single frequency may be about 120 Hz or about 240 Hz.

In the multi-frequency mode MFM, the display area DA of the display device DD is divided into a plurality of display areas that have different drive frequencies. In an embodiment of the present invention, in the multi-frequency mode MFM, the display area DA may be divided into a first display area DA1 and a second display area DA2. The first and second display areas DA1 and DA2 are disposed adjacent to each other in the first direction DR1. The drive frequency of the first display area DA1 may be the same as or greater than the single frequency, and the drive frequency of the second display area DA2 may be less than the single frequency. For example, when the single frequency is about 60 Hz, the first display area DA1 may have a drive frequency of about 60 Hz, 80 Hz, 90 Hz, 100 Hz, 120 Hz, 240 Hz, or the like, and the second display area DA2 may have a drive frequency of about 1 Hz, 20 Hz, 30 Hz, 40 Hz, or the like.

In an embodiment of the present invention, the first display area DA1 may be a region on which is displayed a first image IM1 such as a dynamic image that requires high-speed operation, and the second display area DA2 may be a region on which is displayed a second image IM2 such as a static image that does not requires a high-speed operation or a text image that does not changed frequently. Therefore, when a dynamic image and a static image are concurrently displayed on a screen of the display device DD, the display device DD may operate in the multi-frequency mode MFM to increase display quality of the dynamic image and to reduce overall power consumption.

Referring to FIG. 2B, in the multi-frequency mode MFM, the first and second display areas DA1 and DA2 of the display device DD may display an image during a plurality of drive frames. Each of the drive frames may include a full frame FF in which are driven the first display area DA1 and the second display area DA2, and may also include partial frames HF1 to HF99 in each of which only the first display area DA1 is driven. Each of the partial frames HF1 to HF99 may have a duration time the same as or less than that of the full frame FF. The number of the partial frames HF1 to HF99 included in each drive frame may be the same as or different from each other. Each drive frame may be defined to indicate a period between a current full frame FF and a next full frame FF.

In an embodiment of the present invention, during each drive frame DF, the first display area DA1 may operate at about 100 Hz, and the second display area DA2 may operate at about 1 Hz. In this case, each drive frame DF may have a duration time that corresponds to one second (1 sec), and may include one full frame FF and 99 partial frames HF1 to HF99. During each drive frame DF, the first display area DA1 of the display device DD may display one hundred first images IM1 that correspond to one full frame FF and 99 partial frames HF1 to HF99, and the second display area DA2 of the display device DD may display one second image IM2 that corresponds to one full frame FF.

For convenience of description, FIG. 2B illustrates by way of example that, in the multi-frequency mode MFM, the first display area DA1 has a drive frequency of about 100 Hz, and the second display area DA2 has a drive frequency of about 1 Hz, but the present invention is not limited thereto. For example, the first display area DA1 may have a drive frequency of about 100 Hz, and the second display area DA2 may have a drive frequency of about 20 Hz. In this case, during each drive frame DF, the first display area DA1 of the display device DD may display five first images IM1 that correspond to one full frame FF and four partial frames, and the second display area DA2 of the display device DD may display one second image IM2 that corresponds to the full frame FF. For another example, the first display area DA1 may have a drive frequency of about 90 Hz, and the second display area DA2 may have a drive frequency of about 30 Hz. In this case, during each drive frame DF, the first display area DA1 of the display device DD may display three first images IM1 that correspond to one full frame FF and two partial frames, and the second display area DA2 of the display device DD may display one second image IM2 that corresponds to the full frame FF.

The display device DD may display an image in the variable frequency mode. For example, in the variable frequency mode, the display area (see DA of FIG. 2A) of the display device DD may operate at a variable drive frequency. For example, a variable frame frequency may be variously changed within a range from about 1 Hz to about 240 Hz, but the present invention is not limited thereto.

Figure 3:
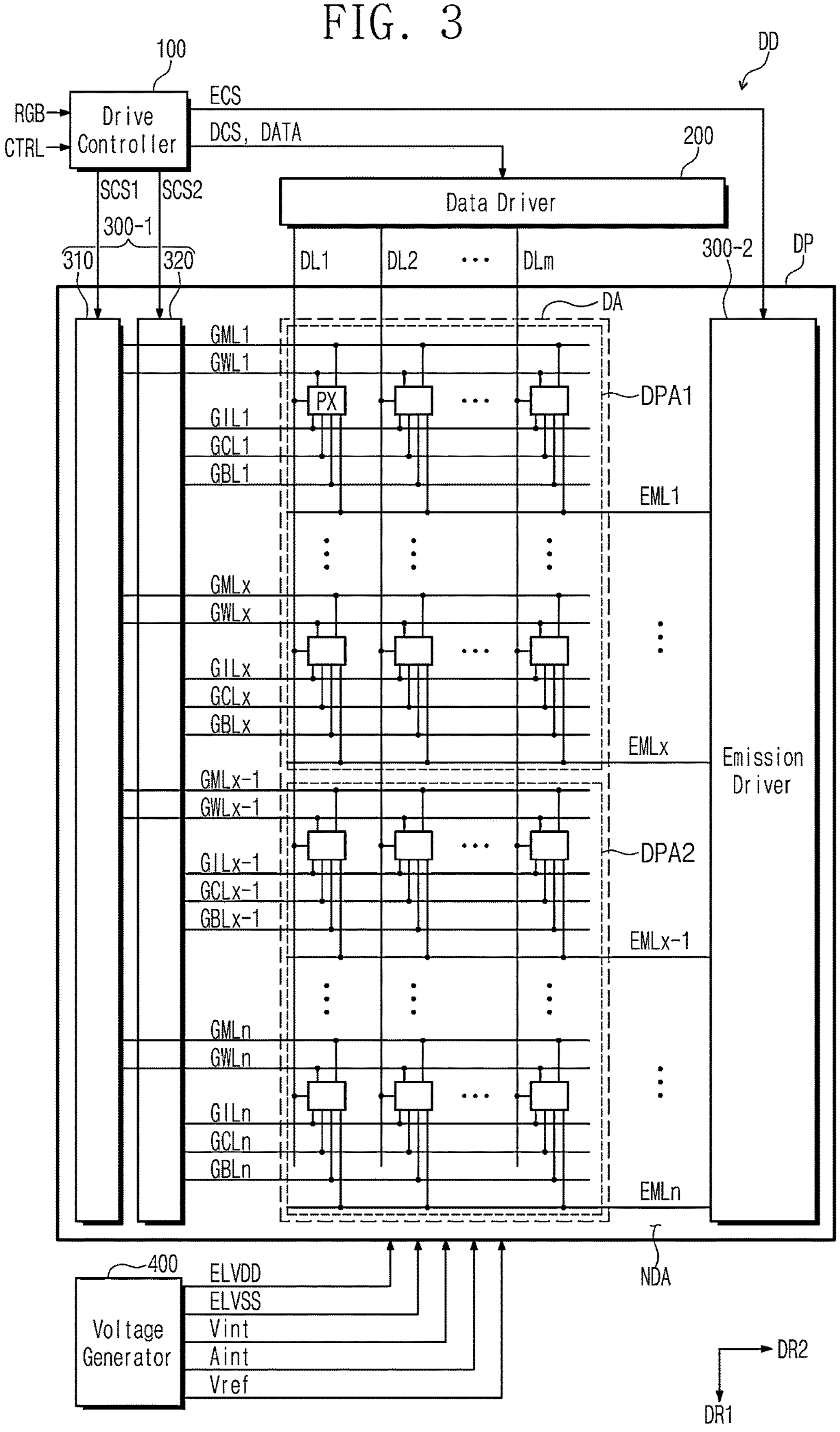
FIG. 3 illustrates a block diagram showing a display device according to an embodiment of the present invention.

FIG. 3 illustrates a block diagram showing a display device DD according to an embodiment of the present invention.

Referring to FIG. 3, the display device DD includes a display panel DP, a panel driver, and a drive controller 100. In an embodiment of the present invention, the panel driver includes a data driver 200, a scan driver 300-1, an emission driver 300-2, and a voltage generator 400.

The drive controller 100 receives an image signal RGB and a control signal CTRL. The drive controller 100 generates an image data DATA obtained by converting data formats of the image signal RGB so as to meet interface specifications of the data driver 200. The drive controller 100 outputs a scan control signal SCS1 and SCS2, a data control signal DCS, and a drive control signal ECS.

The data driver 200 receives the data control signal DCS and the image data DATA from the drive controller 100. The data driver 200 converts the image data DATA into data signals, and outputs the data signals to a plurality of data lines DL1 to DLm which will be discussed below. The data signals may be analog voltages that correspond to gray scales of the image data DATA.

In an embodiment of the present invention, the scan driver 300-1 includes a first scan driver 310 and a second scan driver 320. The scan control signal SCS1 and SCS2 includes a first scan control signal SCS1 that the first scan driver 310 receives from the drive controller 100, and a second scan control signal SCS2 that the second scan driver 320 receives from the drive controller 100. In respective response to first and second scan control signals SCS1 and SCS2, the first and second scan drivers 310 and 320 may output scan signals to scan lines. FIG. 3 depicts by way of example a configuration in which the display device DD includes two scan drivers 310 and 320, but no limitation is imposed on the number of scan drivers.

The voltage generator 400 generates voltages required for operation of the display panel DP. In the present embodiment, the voltage generator 400 generates a first drive voltage ELVDD, a second drive voltage ELVSS, a first initialization voltage Vint, a second initialization voltage Aint, and a reference voltage Vref.

The display panel DP includes initialization scan lines GIL1 to GILn, compensation scan lines GCL1 to GCLn, masking scan lines GML1 to GMLn, write scan lines GWL1 to GWLn, black scan lines GBL1 to GBLn, emission control lines EML1 to EMLn, data lines DL1 to DLm, and pixels PX.

The initialization scan lines GIL1 to GILn, the compensation scan lines GCL1 to GCLn, the masking scan lines GML1 to GMLn, the write scan lines GWL1 to GWLn, the black scan lines GBL1 to GBLn, and the emission control lines EML1 to EMLn extend in the second direction DR2 and are arranged spaced apart from each other in the first direction DR1, but the data lines DL1 to DLm extend in the first direction DR1 and are arranged spaced apart from each other in the second direction DR2.

A plurality of pixels PX are electrically connected to the initialization scan lines GIL1 to GILn, the compensation scan lines GCL1 to GCLn, the masking scan lines GML1 to GMLn, the write scan lines GWL1 to GWLn, the black scan lines GBL1 to GBLn, the emission control lines EML1 to EMLn, and the data lines DL1 to DLm.

Each of the plurality of pixels PX may be electrically connected to five scan lines. For example, as shown in FIG. 3, the pixels PX in a first row may be connected to a first initialization scan line GIL1 a first compensation scan line GCL1, a first masking scan line GML1, a first write scan line GWL1, and a first black scan line GBL1. The pixels P in an $(x-1)^{th}$ row may be connected to an $(x-1)^{th}$ initialization scan line GILx-1, an $(x-1)^{th}$ compensation scan line GCLx-1, an $(x-1)^{th}$ masking scan line GMLx-1, an $(x-1)^{th}$ write scan line GWLx-1, and an $(x-1)^{th}$ black scan line GBLx-1. The pixels P in an $x^{th}$ row may be connected to an $x^{th}$ initialization scan line GILx, an $x^{th}$ compensation scan line GCLx, an $x^{th}$ masking scan line GMLx, an $x^{th}$ write scan line GWLx, and an $x^{th}$ black scan line GBLx. The pixels P in an nth row may be connected to an nth initialization scan line GILn, an nth compensation scan line GCLn, an nth masking scan line GMLn, an nth write scan line GWLn, and an nth black scan line GBLn.

In response to the first scan control signal SCS1, the first scan driver 310 may output masking scan signals to the masking scan lines GML1 to GMLn, and may output write scan signals to the write scan lines GWL1 to GWLn. The second scan driver 320 may output initialization scan signals to the initialization scan lines GIL1 to GILn, may output compensation scan signals (or scan signals) to the compensation scan lines GCL1 to GCLn, and may output black scan signals to the black scan lines GBL1 to GBLn.

The emission driver 300-2 receives the drive control signal ECS from the drive controller 100. In response to the drive control signal ECS, the emission driver 300-2 may output emission control signals to the emission control lines EML1 to EMLn.

Each of the plurality of pixels PX includes a light emitting element (see ED of FIG. 4) and a pixel circuit (see PXC of FIG. 4) that controls a light emission of the light emitting element ED. The pixel circuit PXC includes a plurality of transistors and a capacitor. The scan driver 300-1 and the emission driver 300-2 may include transistors that are formed by the same process used for forming the pixel circuit PXC.

Each of the plurality of pixels PX may receive the first drive voltage ELVDD, the second drive voltage ELVSS, the first initialization voltage Vint, the second initialization voltage Aint, and the reference voltage Vref from the voltage generator 400.

Figure 4:
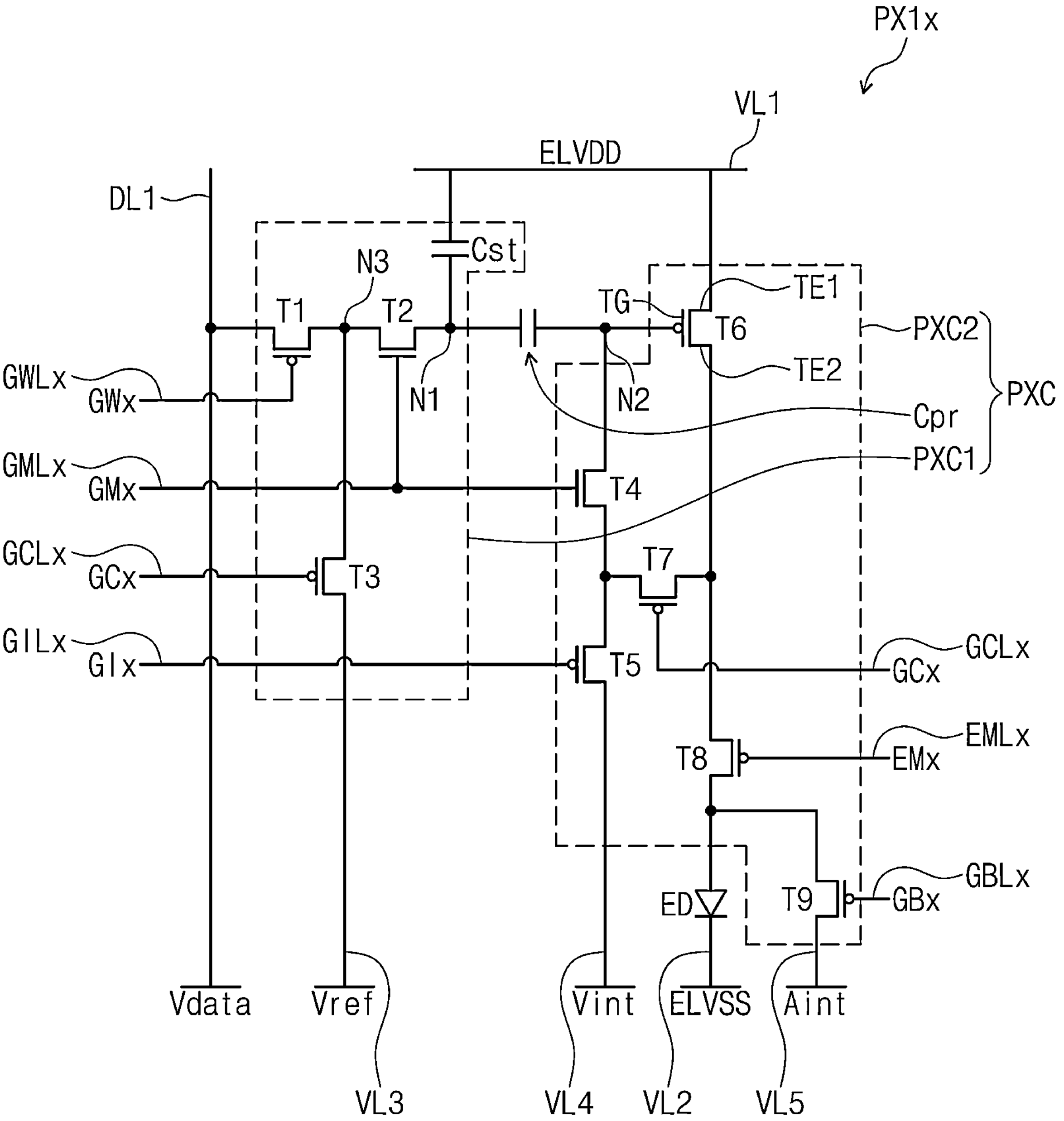
FIG. 4 illustrates a circuit diagram showing a pixel according to an embodiment of the present invention.

FIG. 4 illustrates a circuit diagram showing a pixel according to an embodiment of the present invention.

Referring to FIGS. 3 and 4, a pixel PX1x may include a pixel circuit PXC and at least one light emitting element ED.

The pixels PX1x may be coupled to an $x^{th}$ initialization scan line GILx, an $x^{th}$ compensation scan line GCLx, an $x^{th}$ masking scan line GMLx, an $x^{th}$ write scan line GWLx, an $x^{th}$ black scan line GBLx, an $x^{th}$ emission control line EMLx, and a first data line DL1.

The pixel circuit PXC may include a first circuit portion PXC1, a second pixel portion PXC2, and a first capacitor Cpr. The first capacitor Cpr and the first circuit portion PXC1 may be coupled to each other at a first node N1. The first capacitor Cpr and the second circuit portion PXC2 may be coupled to each other at a second node N2.

The first circuit portion PXC1 may include a first transistor T1, a second transistor T2, a third transistor T3, and a second capacitor Cst. The second capacitor Cst may be connected between the first node N1 and a first drive voltage line VL1. The second circuit portion PXC2 may include a fourth transistor T4, a fifth transistor T5, a sixth transistor T6, a seventh transistor T7, an eighth transistor T8, and a ninth transistor T9.

The first to ninth transistors T1 to T9 may each be an n-type thin film transistor in which an oxide semiconductor is used as a semiconductor layer or a p-type thin film transistor having a low-temperature polycrystalline silicon ("LTPS") semiconductor layer. For example, the second and fourth transistors T2 and T4 may be n-type thin film transistors, and first, third, fifth, sixth, seventh, eighth, and ninth transistors T1, T3, T5, T6, T7, T8, and T9 may be p-type thin film transistors. The p-type thin film transistor may be a p-channel metal-oxide semiconductor thin film transistor including a silicon semiconductor layer. The n-type thin film transistor may be an n-channel metal-oxide semiconductor thin film transistor including an oxide semiconductor layer.

The pixel PX1x may receive an $x^{th}$ initialization scan signal GIx (hereinafter, an initialization scan signal), an $x^{th}$ compensation scan signal GCx (hereinafter, a compensation scan signal), an $x^{th}$ masking scan signal GMx (hereinafter, a masking scan signal), an $x^{th}$ write scan signal GWx (hereinafter, a write scan signal), and an $x^{th}$ black scan signal GBx (hereinafter, a black scan signal) that are transferred from an $x^{th}$ initialization scan line GILx, an $x^{th}$ compensation scan line GCLx, an $x^{th}$ masking scan line GMLx, an $x^{th}$ write scan line GWLx, and an $x^{th}$ black scan line GBLx, respectively.

The data line DL1 transfers a data signal Vdata to the pixel PX1x. The data signal Vdata may have a voltage level that corresponds to gray scale of a corresponding one of the image signals RGB that are input to the display device (see DD of FIG. 3). The pixel PX1x may receive the first drive voltage ELVDD, the second drive voltage ELVSS, the reference voltage Vref, the first initialization voltage Vint, and the second initialization voltage Aint that are transferred from first, second, third, fourth, and fifth drive voltage lines VL1, VL2, VL3, VL4, and VL5, respectively.

The first transistor T1 may be connected between the data line DL1 and the first node N1, and the second transistor T2 may be connected between the first transistor T1 and the first node N1. For example, the first transistor T1 and the second transistor T2 may be connected in series between the data line DL1 and the first node N1.

In response to the write scan signal GWx, the first transistor T1 may be controlled in its operation. When the first transistor T1 is turned on, the data signal Vdata provided to the data line DL1 may be transferred to a third node N3 between the first transistor T1 and the second transistor T2.

In response to the masking scan signal GMx, the second transistor T2 may be controlled in its operation. When the second transistor T2 is turned on, the first node N1 and the third node N3 may be electrically connected to each other. When the second transistor T2 is turned off, there may be an interruption of path between the first node N1 and the third node N3. In this case, the second transistor T2 may block a path of leakage current that flows in a direction toward the first transistor T1. In addition, in the multi-frequency mode MFM, the second transistor T2 may block transfer of the data signal Vdata to the first node N1.

The third transistor T3 may be connected between the third node N3 and the third drive voltage line VL3. The third drive voltage line VL3 may be called a "reference voltage line" to which the reference voltage Vref is provided. In response to the compensation scan signal GCx, the third transistor T3 may be controlled in its operation. When the third transistor T3 is turned on, the reference voltage Vref provided through the reference voltage line VL3 may be transferred to the third node N3.

The fourth transistor T4 may be connected between the second node N2 and the fourth drive voltage line VL4, and the fifth transistor T5 may be connected between the fourth transistor T4 and the fourth drive voltage line VL4. For example, the fourth transistor T4 and the fifth transistor T5 may be connected in series between the second node N2 and the fourth drive voltage line VL4. The fourth drive voltage line VL4 may be called a "first initialization voltage line" to which the first initialization voltage Vint is provided.

In response to the masking scan signal GMx, the fourth transistor T4 may be controlled in its operation. For example, the fourth transistor T4 and the second transistor T2 may be controlled in their operations by the same scan signal (i.e., the masking scan signal GMx). When the fourth transistor T4 is turned off, there may be an interruption of the path between the second node N2 and the fifth transistor T5. In this case, the fourth transistor T4 may block a path of leakage current that flows in a direction toward the fifth transistor T5.

In response to the initialization scan signal GIx, the fifth transistor T5 may be controlled in its operation. When the fourth and fifth transistors T4 and T5 are turned on, the first initialization voltage Vint may be transferred to the second node N2. For example, the second node N2 may be initialized to the first initialization voltage Vint.

The sixth transistor T6 may include a gate electrode TG, a first electrode TE1, and a second electrode TE2. The gate electrode TG may be coupled to the second node N2, and the first electrode TE1 may be coupled to the first drive voltage line VL1. The sixth transistor T6 may be called a "drive thin film transistor." The light emitting element ED may emit light corresponding to an amount of current that flows through the sixth transistor T6.

The seventh transistor T7 may be connected between the second electrode TE2 of the sixth transistor T6 and a node between the fourth and fifth transistors T4 and T5. In response to the compensation scan signal GCx, the seventh transistor T7 may be controlled in its operation. When the fourth and seventh transistors T4 and T7 are turned on, there may be a connection between the gate electrode TG and the second electrode TE2 of the sixth transistor T6. In this case, the sixth transistor T6 may be diode-connected, and the second node N2 may be applied with a compensation voltage for which a threshold voltage of the sixth transistor T6 is compensated.

The eighth transistor T8 may be connected between the light emitting element ED and the second electrode TE2 of the sixth transistor T6. In response to the emission scan signal EMx, the eighth transistor T8 may be controlled in its operation. As the eighth transistor T8 is turned on, a current path may be formed through the sixth and eighth transistors T6 and T8 between the first drive voltage line VL1 and the light emitting element ED.

The ninth transistor T9 may be connected between the fifth drive voltage line VL5 and a node between the light emitting element ED and the eighth transistor T8. The fifth drive voltage line VL5 may be called a "second initialization voltage line" to which the second initialization voltage Aint is provided. In response to the black scan signal GBx, the ninth transistor T9 may be controlled in its operation.

In a case where the pixel PX1x displays a black image, if the light emitting element ED emits light even when a minimum drive current of the sixth transistor T6 flows as a drive current, the pixel PX1x may not normally display the black image. In this description, the minimum drive current of the sixth transistor T6 indicates a current that flows to the sixth transistor T6 under a condition where the sixth transistor T6 is turned off because a gate-source voltage of the sixth transistor T6 is less than a threshold voltage of the sixth transistor T6. Therefore, the ninth transistor T9 in the pixel PX1x according to an embodiment of the present invention may cause a portion of the minimum drive current flowing through the sixth transistor T6 (i.e., bypass current), which flows to a current path (i.e., the ninth transistor T9) other than the path toward the light emitting element ED. Accordingly, the pixel PX1x may use the ninth transistor T9 to achieve an exact black gray-scale image, which may result in an increase in contrast ratio.

The light emitting element ED may include an anode and a cathode. The anode of the light emitting element ED may be coupled to the eighth transistor T8, and the cathode of the light emitting element ED may be coupled to the second drive voltage line VL2.

Figure 5:
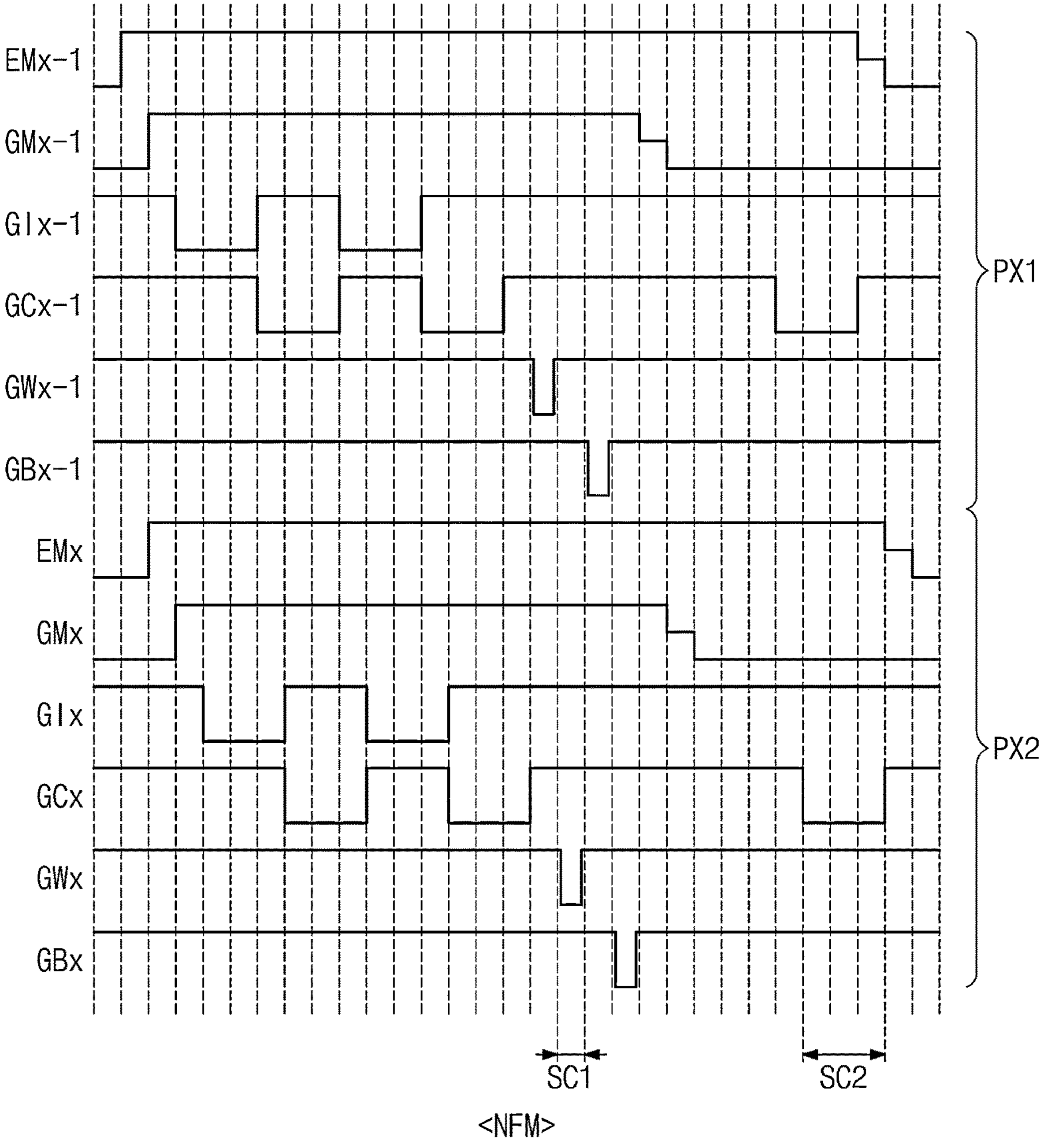
FIG. 5 illustrates a waveform diagram showing an operation of pixels operated in a single frequency mode.

FIG. 5 illustrates a waveform diagram showing an operation of pixels PX1 and PX2 operated in a single frequency mode.

Referring to FIGS. 3, 4, and 5, a first pixel PX1 may be one of the pixels PX in the $(x-1)^{th}$ row, and a second pixel PX2 may be one of the pixels PX in the $x^{th}$ row. Here, the first pixel PX1 and the second pixel PX2 may each have the same structure as the structure of the pixel PX1x in FIG. 4.

The display panel DP may include a first portion DPA1 and a second portion DPA2. The first pixel PX1 may be a pixel disposed in the first portion DPA1, and the second pixel PX2 may be a pixel disposed in the second portion DPA2. For example, in the multi-frequency mode (see MFM of FIG. 2B), the first portion DPA1 may correspond to the first display area (see DA1 of FIG. 2B), and the second portion DPA2 may correspond to the second display area (see DA2 of FIG. 2B).

When the display panel DP operates in the single frequency mode NFM, the first pixel PX1 may be provided with an $(x-1)^{th}$ initialization scan signal GIx-1, an $(x-1)^{th}$ compensation scan signal GCx-1, an $(x-1)^{th}$ masking scan signal GMx-1, an (x−1)th write scan signal GWx-1, an (x−1)th black scan signal GBx-1, and an $(x-1)^{th}$ emission control signal EMx-1. When the display panel DP operates in the single frequency mode NFM, the second pixel PX2 may be provided with an $x^{th}$ initialization scan signal GIx, an $x^{th}$ compensation scan signal GCx, an $x^{th}$ masking scan signal GMx, an $x^{th}$ write scan signal GWx, an $x^{th}$ black scan signal GBx, and an $x^{th}$ emission control signal EMx.

Each of the $x^{th}$ initialization scan signal GIx, the $x^{th}$ compensation scan signal GCx, the $x^{th}$ masking scan signal GMx, the $x^{th}$ write scan signal GWx, the $x^{th}$ black scan signal GBx, and the $x^{th}$ emission control signal EMx may have a waveform shifted by as much as one horizontal period of a corresponding one of the $(x-1)^{th}$ initialization scan signal GIx-1, the $(x-1)^{th}$ compensation scan signal GCx-1, the $(x-1)^{th}$ masking scan signal GMx-1, the $(x-1)^{th}$ write scan signal GWx-1, the $(x-1)^{th}$ black scan signal GBx-1, and the $(x-1)^{th}$ emission control signal EMx-1.

For the second pixel PX2, when the $x^{th}$ emission control signal EMx has an inactive level (e.g., high level), and when the $x^{th}$ masking scan signal GMx has an active level (e.g., high level), the $x^{th}$ initialization scan signal GIx and the $x^{th}$ compensation scan signal GCx may alternately have an active level (e.g., low relevel). An "initialization period" may be a period when the $x^{th}$ initialization scan signal GIx has a low level, and a "compensation period" may be a period when the $x^{th}$ compensation scan signal GCx has a low level. For example, in the initialization period the second node N2 may be initialized to the first initialization voltage Vint, and in the compensation period the sixth transistor T6 is diode-connected, with the result that the sixth transistor T6 may be applied with a compensation voltage for which a threshold voltage of the sixth transistor T6 is compensated.

In a first period SC1, the $x^{th}$ masking scan signal GMx may have an active level (e.g., high level), and the $x^{th}$ write scan signal GWx may have an active level (e.g., low level). In the first period SC1, the data signal Vdata may be input to the second pixel PX2, and the first period SC1 may be called a "write period".

In a second period SC2, the $x^{th}$ masking scan signal GMx may have an inactive level (e.g., low level), and the $x^{th}$ compensation scan signal GCx may have an active level (e.g., low level). In the second period SC2, the third node N3 may be initialized to the reference voltage Vref.

Afterwards, as the $x^{th}$ emission control signal EMx is transited to an active level (e.g., low level), a current path may be formed through the sixth and eighth transistors T6 and T8 between the first drive voltage line VL1 and the light emitting element ED.

According to an embodiment of the present invention, before the light emitting element ED emits light, the reference voltage Vref may be applied to the third node N3 between the first transistor T1 and the second transistor T2. For example, in a data write frame where data is written, the third node N3 is initialized to the reference voltage Vref before the light emitting element ED emits light.

Figure 6:
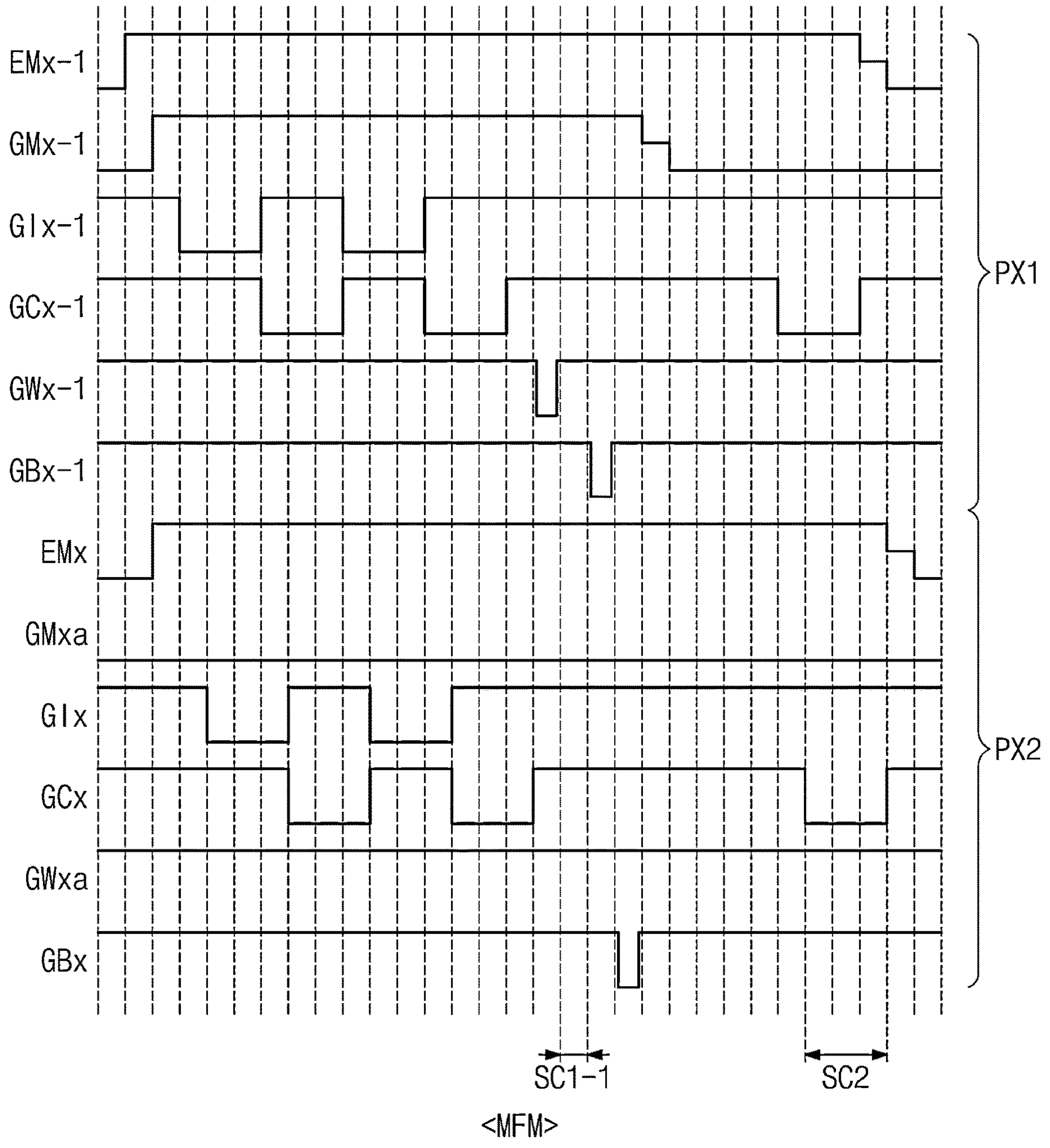
FIG. 6 illustrates a waveform diagram showing an operation of pixels operated in a multi-frequency mode.
Figure 7A:
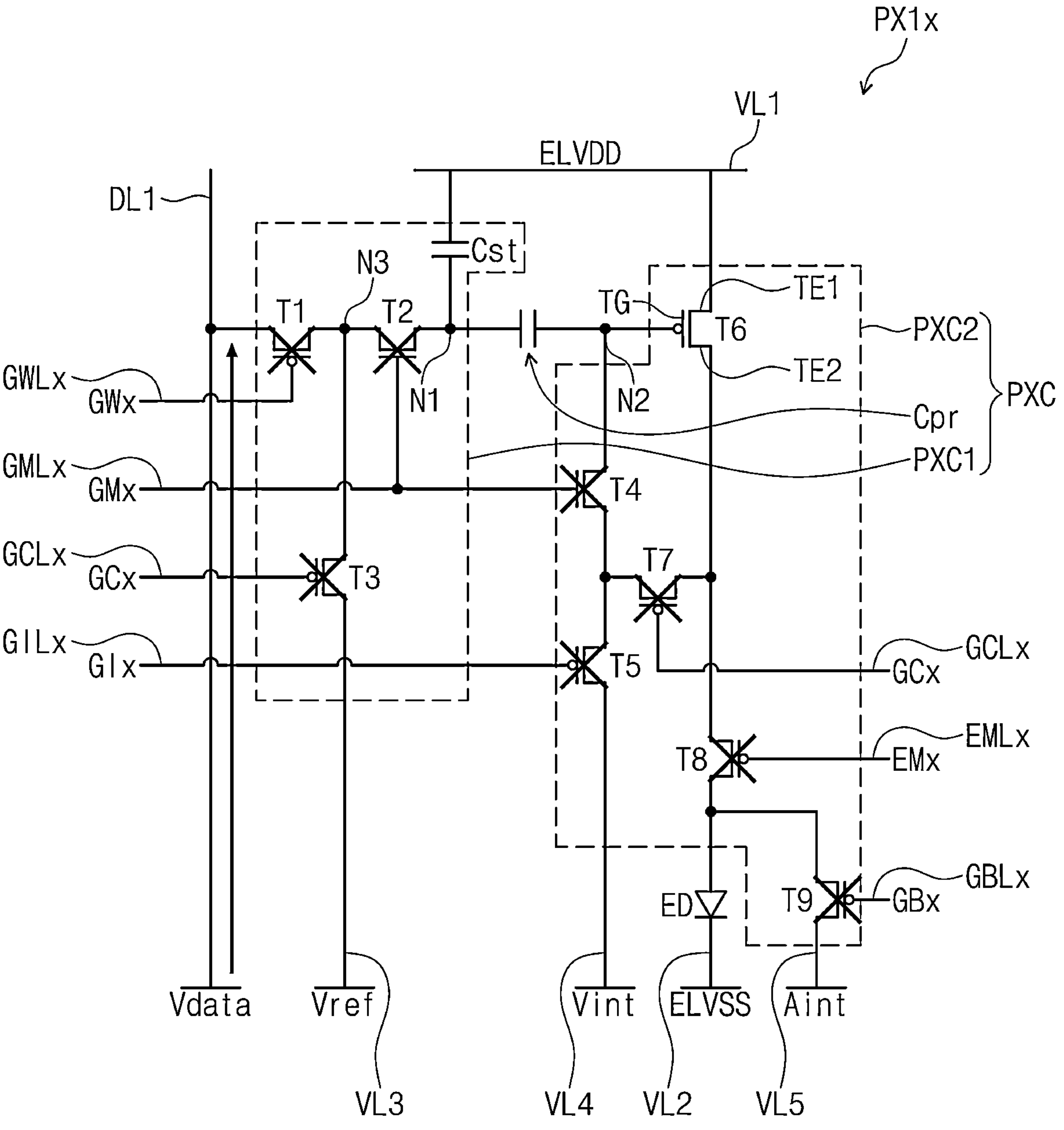
FIG. 7A illustrates a diagram showing a pixel operation in a first period depicted in FIG. 6.
Figure 7B:
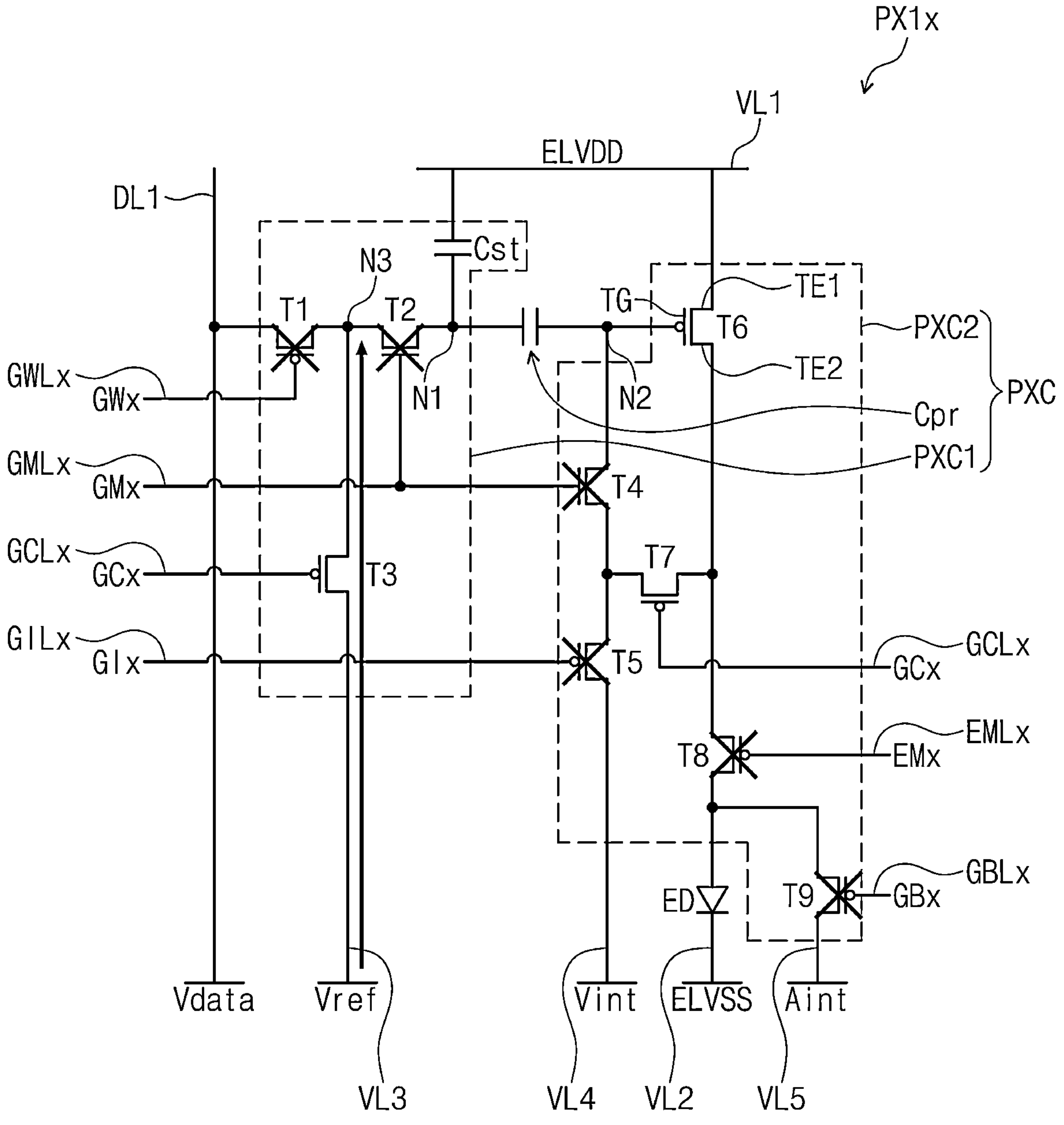
FIG. 7B illustrates a diagram showing a pixel operation in a second period depicted in FIG. 6.

FIG. 6 illustrates a waveform diagram showing an operation of pixels PX1 and PX2 operated in a multi-frequency mode. FIG. 7A illustrates a diagram showing a pixel operation in a first period SC1-1 depicted in FIG. 6. FIG. 7B illustrates a diagram showing a pixel operation in a second period SC2 depicted in FIG. 6.

Referring to FIGS. 6, 7A, and 7B, when the display (see DP of FIG. 3) operates in the multi-frequency mode MFM, the first pixel PX1 may be provided with an $(x-1)^{th}$ initialization scan signal GIx-1, an $(x-1)^{th}$ compensation scan signal GCx-1, an $(x-1)^{th}$ masking scan signal GMx-1, an $(x-1)^{th}$ write scan signal GWx-1, an (x−1)th black scan signal GBx-1, and an $(x-1)^{th}$ emission control signal EMx-1. When the display panel (see DP of FIG. 3) operates in the multi-frequency mode MFM, the second pixel PX2 may be provided with an $x^{th}$ initialization scan signal GIx, an $x^{th}$ compensation scan signal GCx, an $x^{th}$ masking scan signal GMxa, an $x^{th}$ write scan signal GWxa, an $x^{th}$ black scan signal GBx, and an $x^{th}$ emission control signal EMx.

A frame depicted in FIG. 5 may be a full frame in which data is written to the first pixel PX1 and the second pixel PX2, and a frame depicted in FIG. 6 may be a partial frame in which data is written to the first pixel PX1 and previously written data is maintained in the second pixel PX2. The partial frame may be a data write frame for the first pixel PX1, and may be a hold frame for the second pixel PX2.

In the hold frame, the $x^{th}$ masking scan signal GMxa may have an inactive level (e.g., low level), and the $x^{th}$ write scan signal GWxa may have an inactive level (e.g., high level).

Therefore, the data signal Vdata may be transmitted neither to the third node N3 nor to the first node N1.

In a first period SC1-1 that corresponds to the first period SC1 of FIG. 5, the $x^{th}$ masking scan signal GMxa may have an inactive level (e.g., low level), and the $x^{th}$ write scan signal GWxa may have an inactive level (e.g., high level). Thus, in the first period SC1-1, the data signal Vdata may not be input to the second pixel PX2.

In a second period SC2, the $x^{th}$ masking scan signal GMxa may have an inactive level (e.g., low level), and the $x^{th}$ compensation scan signal GCx may have an active level (e.g., low level). In the second period SC2, the third node N3 may be initialized to the reference voltage Vref. Afterwards, as the $x^{th}$ emission control signal EMx is transited to an active level (e.g., low level), a current path may be formed through the sixth and eighth transistors T6 and T8 between the first drive voltage line VL1 and the light emitting element ED.

According to an embodiment of the present invention, before the light emitting element ED emits light, the reference voltage Vref may be applied to the third node N3 between the first transistor T1 and the second transistor T2. For example, in the hold frame where previous data is held, the third node N3 is initialized to the reference voltage Vref before the light emitting element ED emits light.

According to an embodiment of the present invention, in both of the data write frame and the hold frame, the third node N3 may be initialized to the reference voltage Vref before the light emitting element ED emits light. In this case, even when a voltage of the third node N3 and a voltage of the second node N2 are coupled with each other due to the first capacitor Cpr and a parasitic capacitor which is formed between the first node N1 and the third node N3, the third node N3 may be maintained at the reference voltage Vref and thus image quality issues such as variation in brightness do not occur. For example, there may be a reduction in brightness difference between the data write frame and the hold frame, and as a result, the display device (see DD of FIG. 1A) may effectively increase in display quality.

Figure 8:
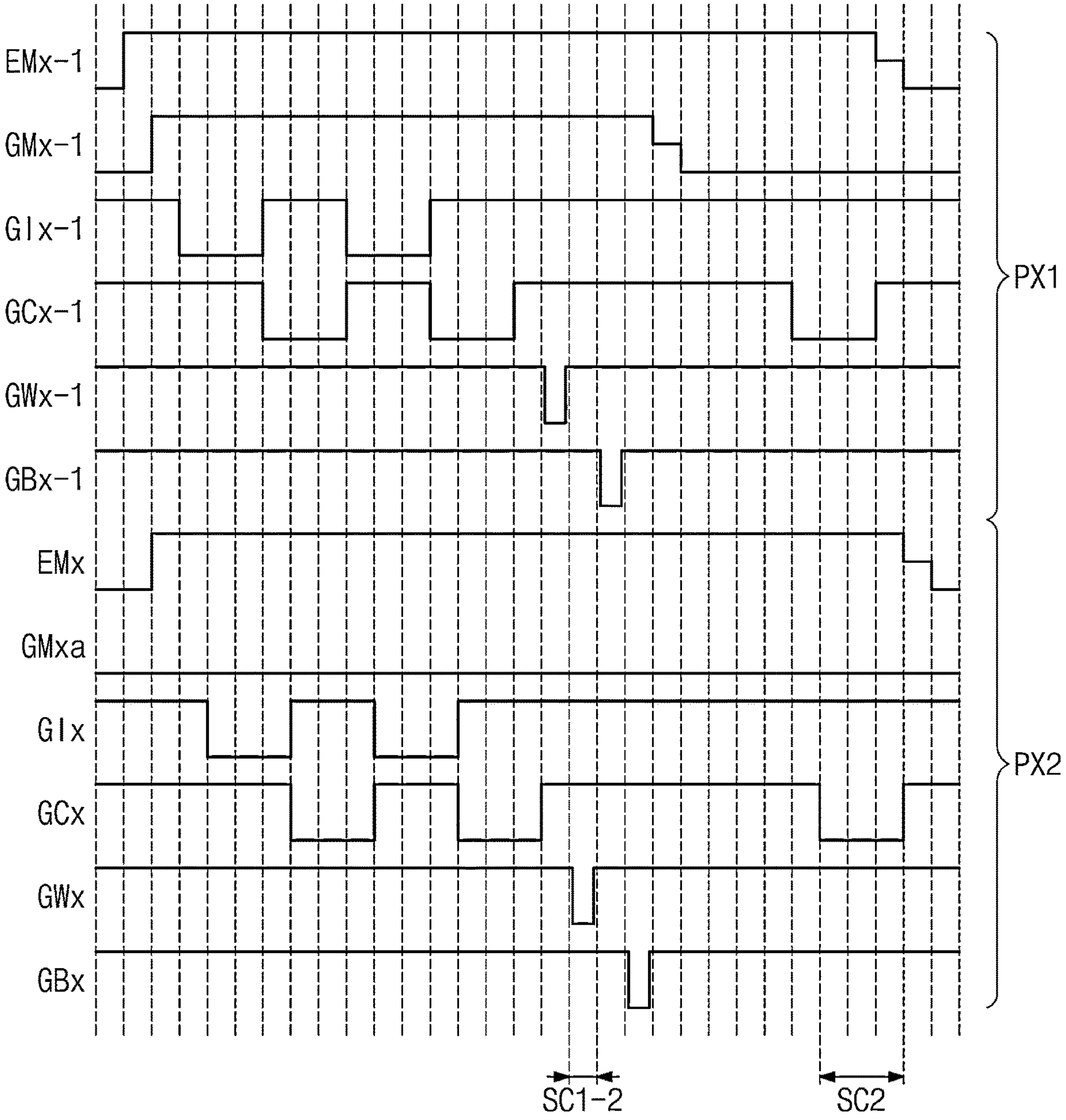
FIG. 8 illustrates a waveform diagram showing an operation of pixels operated in a multi-frequency mode according to another embodiment of the present invention.
Figure 9:
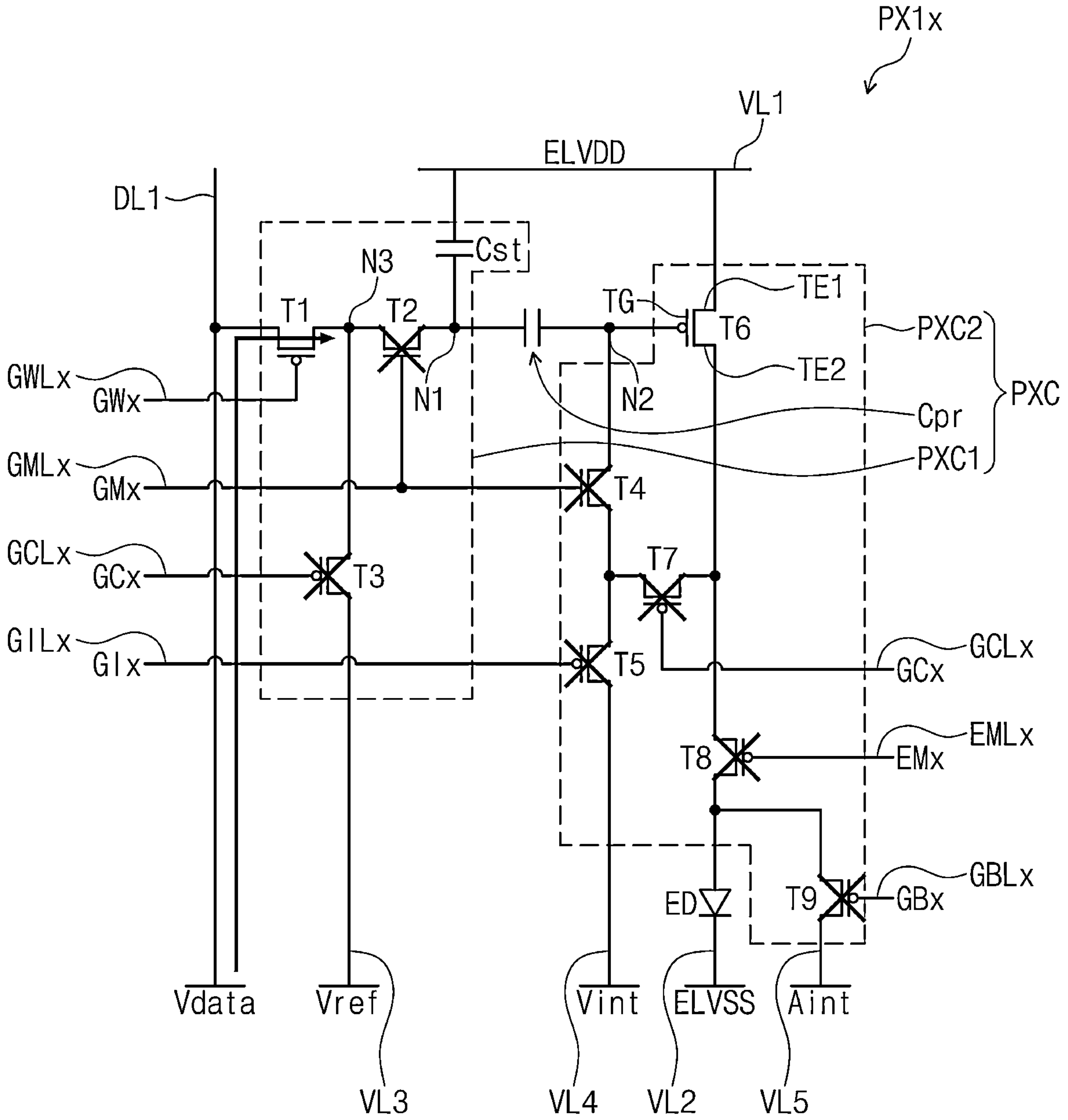
FIG. 9 illustrates a diagram showing a pixel operation in a first period depicted in FIG. 8.

FIG. 8 illustrates a waveform diagram showing an operation of pixels operated in a multi-frequency mode according to another embodiment of the present invention. FIG. 9 illustrates a diagram showing a pixel operation in a first period depicted in FIG. 8. In the embodiment of FIGS. 8 and 9, different components from those of FIGS. 6 and 7A will be discussed, and the same components will be allocated with the same reference numerals and their explanation will be omitted.

In a first period SC1-2 that corresponds to the first period SC1 of FIG. 5, the $x^{th}$ masking scan signal GMxa may have an inactive level (e.g., low level), and the $x^{th}$ write scan signal GWx may have an active level (e.g., low level). Therefore, the data signal Vdata may be provided to the third node N3 and may not be transmitted from the third node N3 to the first node N1.

In a second period SC2, the $x^{th}$ masking scan signal GMxa may have an inactive level (e.g., low level), and the $x^{th}$ compensation scan signal GCx may have an active level (e.g., low level). In the second period SC2, the third node N3 may be initialized to the reference voltage Vref. Afterwards, as the $x^{th}$ emission control signal EMx is transited to an active level (e.g., low level), a current path may be formed through the sixth and eighth transistors T6 and T8 between the first drive voltage line VL1 and the light emitting element ED.

According to an embodiment of the present invention, in both of the data write frame and the hold frame, the third node N3 may be initialized to the reference voltage Vref before the light emitting element ED emits light. Therefore, there may be a reduction in brightness difference between the data write frame and the hold frame, and as a result, the display device (see DD of FIG. 1A) may increase in display quality.

Figure 10:
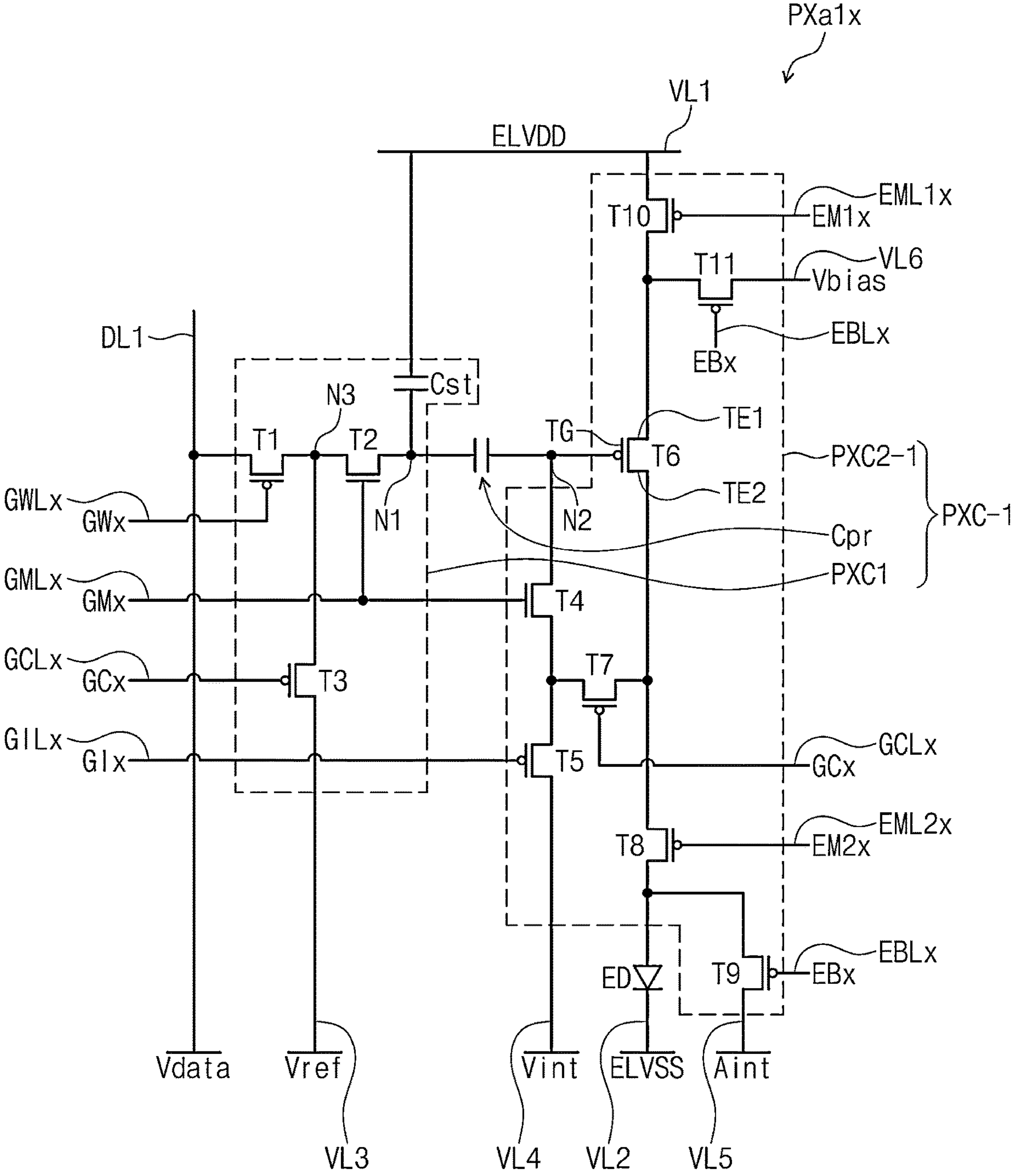
FIG. 10 illustrates a circuit diagram showing a pixel according to another embodiment of the present invention.

FIG. 10 illustrates a circuit diagram showing a pixel according to another embodiment of the present invention. In the embodiment of FIG. 10, different components from those of FIG. 4 will be discussed, and the same components will be allocated with the same reference numerals and their explanation will be omitted Referring to FIG. 10, a pixel PXa1x may include a pixel circuit PXC-1 and at least one light emitting element ED.

The pixels PXa1x may be coupled to an $x^{th}$ initialization scan line GILx, an $x^{th}$ compensation scan line GCLx, an $x^{th}$ masking scan line GMLx, an $x^{th}$ write scan line GWLx, an $x^{th}$ bias scan line EBLx, an $x^{th}$ first emission control line EML1x, an $x^{th}$ second emission control line EML2x, and a first data line DL1.

The pixel circuit PXC-1 may include a first circuit portion PXC1, a second circuit portion PXC2-1, and a first capacitor Cpr. The first capacitor Cpr and the first circuit portion PXC1 may be coupled to each other at the first node N1. The first capacitor Cpr and the second circuit portion PXC2 may be coupled to each other at the second node N2.

The first circuit portion PXC1 may include a first transistor T1, a second transistor T2, a third transistor T3, and a second capacitor Cst. The second circuit portion PXC2 may include a fourth transistor T4, a fifth transistor T5, a sixth transistor T6, a seventh transistor T7, an eighth transistor T8, a ninth transistor T9, a tenth transistor T10, and an eleventh transistor 11. The tenth transistor T10 and the eleventh transistor T11 may each be a p-type thin film transistor having a low-temperature polycrystalline silicon (LTPS) semiconductor layer.

The tenth transistor T10 may be connected between the first drive voltage line VL1 and the first electrode TE1 of the sixth transistor T6. The eleventh transistor T11 may be connected between the sixth drive voltage line VL6 and a node between the sixth and tenth transistors T6 and T10. A bias voltage Vbias may be applied to the sixth drive voltage line VL6, and the sixth drive voltage line VL6 may be called a "vias voltage line."

In response to a first emission scan signal EM1x, the tenth transistor T10 may be controlled in its operation. In response to a second emission scan signal EM2x, the eighth transistor T8 may be controlled in its operation. As the eighth and tenth transistors T8 and T10 are turned on, a current path may be formed through the tenth, sixth, and eighth transistors T10, T6, and T8 between the first drive voltage line VL1 and the light emitting element ED.

In response to a bias scan signal EBx, the ninth and eleventh transistors T9 and T11 may be controlled in their operation. When the eleventh transistor T11 is turned on, the bias voltage Vbias may be applied to a node between the sixth transistor T6 and the tenth transistor T10.

Figure 11:
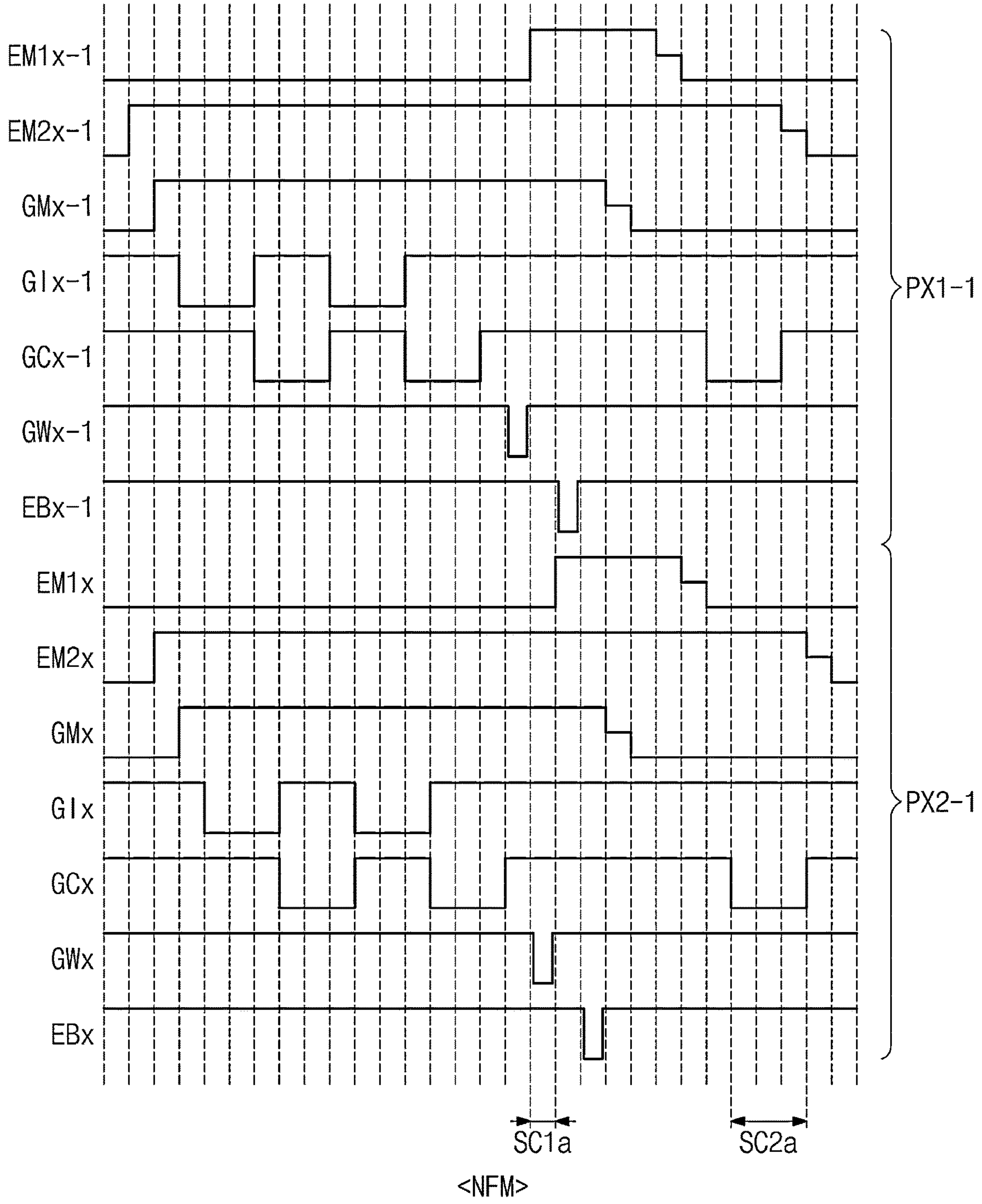
FIG. 11 illustrates a waveform diagram showing an operation of pixels operated in a single frequency mode.

FIG. 11 illustrates a waveform diagram showing an operation of pixels PX1-1 and PX2-1 operated in a single frequency mode.

Referring to FIGS. 3, 10, and 11, a first pixel PX1-1 may be one of the pixels PX in the $(x-1)^{th}$ row, and a second pixel PX2-1 may be one of the pixels PX in the $x^{th}$ row. Here, the first pixel PX1-1 and the second pixel PX2-1 may each have the same structure as the structure of the pixel PXa1x in FIG. 10.

When the display panel DP operates in the single frequency mode NFM, the first pixel PX1-1 may be provided with an $(x-1)^{th}$ initialization scan signal GIx-1, an $(x-1)^{th}$ compensation scan signal GCx-1, an $(x-1)^{th}$ masking scan signal GMx-1, an $(x-1)^{th}$ write scan signal GWx-1, an $(x-1)^{th}$ bias scan signal EBx-1, an $(x-1)^{th}$ first emission control signal EM1x-1, and an $(x-1)^{th}$ second emission control signal EM2x-1. When the display panel DP operates in the single frequency mode NFM, the second pixel PX2-1 may be provided with an $x^{th}$ initialization scan signal GIx, an $x^{th}$ compensation scan signal GCx, an $x^{th}$ masking scan signal GMx, an $x^{th}$ write scan signal GWx, an $x^{th}$ bias scan signal EBx, an $x^{th}$ first emission control signal EM1x, and an $x^{th}$ second emission control signal EM2x.

In a first period SC1a, the $x^{th}$ masking scan signal GMx may have an active level (e.g., high level), and the $x^{th}$ write scan signal GWx may have an active level (e.g., low level). In the first period SC1a, the data signal Vdata may be input to the second pixel PX2-1, and the first period SC1a may be called a "write period."

In a second period SC2a, the $x^{th}$ masking scan signal GMx may have an inactive level (e.g., low level), and the $x^{th}$ compensation scan signal GCx may have an active level (e.g., low level). In the second period SC2a, the third node N3 may be initialized to the reference voltage Vref.

Afterwards, as both of the $x^{th}$ first emission control signal EM1x and the $x^{th}$ second emission control signal EM2x are transited to an active level (e.g., low level), a current path may be formed through the tenth, sixth, and eighth transistors T10, T6, and T8 between the first drive voltage line VL1 and the light emitting element ED.

According to an embodiment of the present invention, before the light emitting element ED emits light, the reference voltage Vref may be applied to the third node N3 between the first transistor T1 and the second transistor T2. For example, in a data write frame where data is written, the third node N3 is initialized to the reference voltage Vref before the light emitting element ED emits light.

Figure 12:
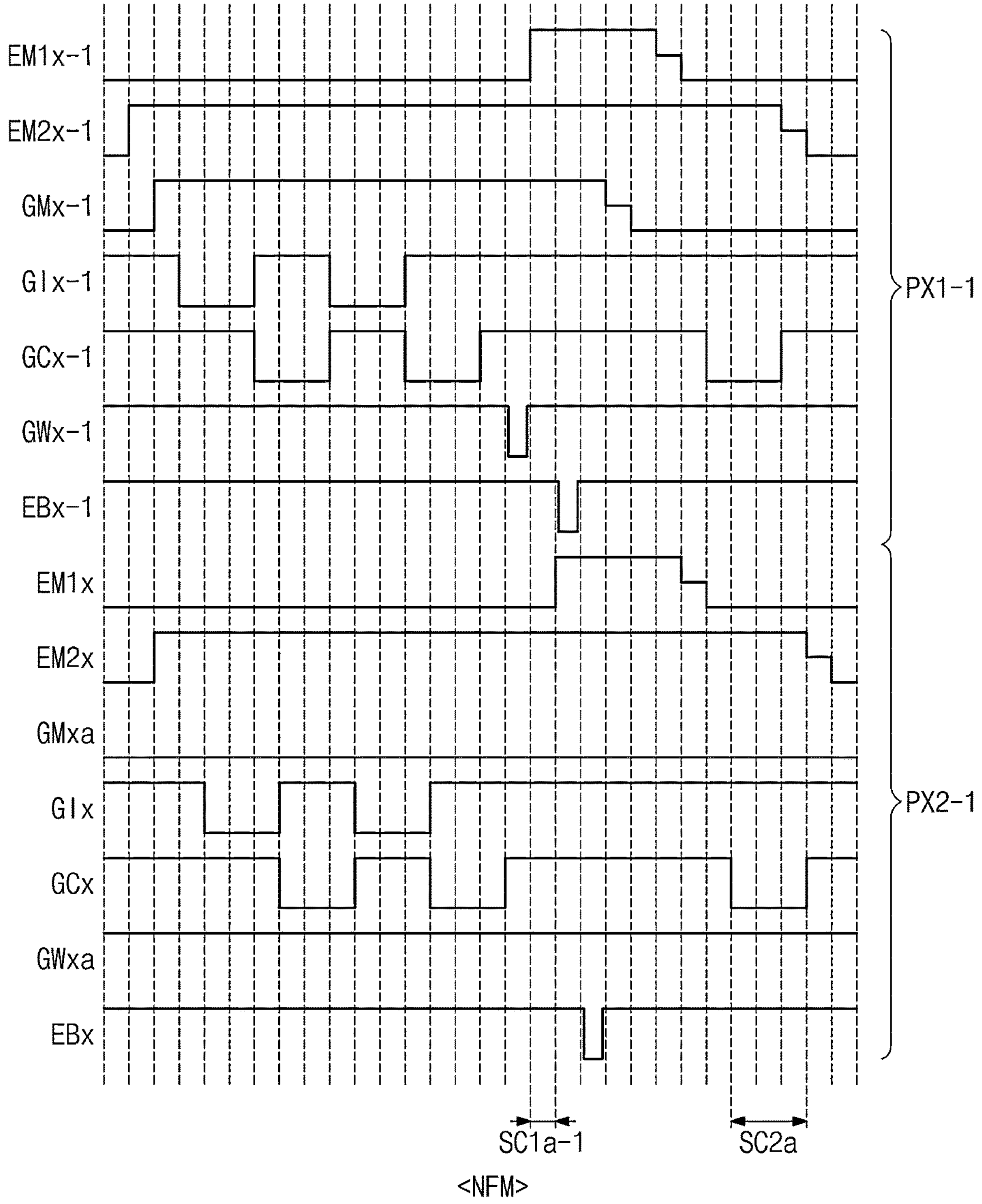
FIG. 12 illustrates a waveform diagram showing an operation of pixels operated in a multi-frequency mode.
Figure 13A:
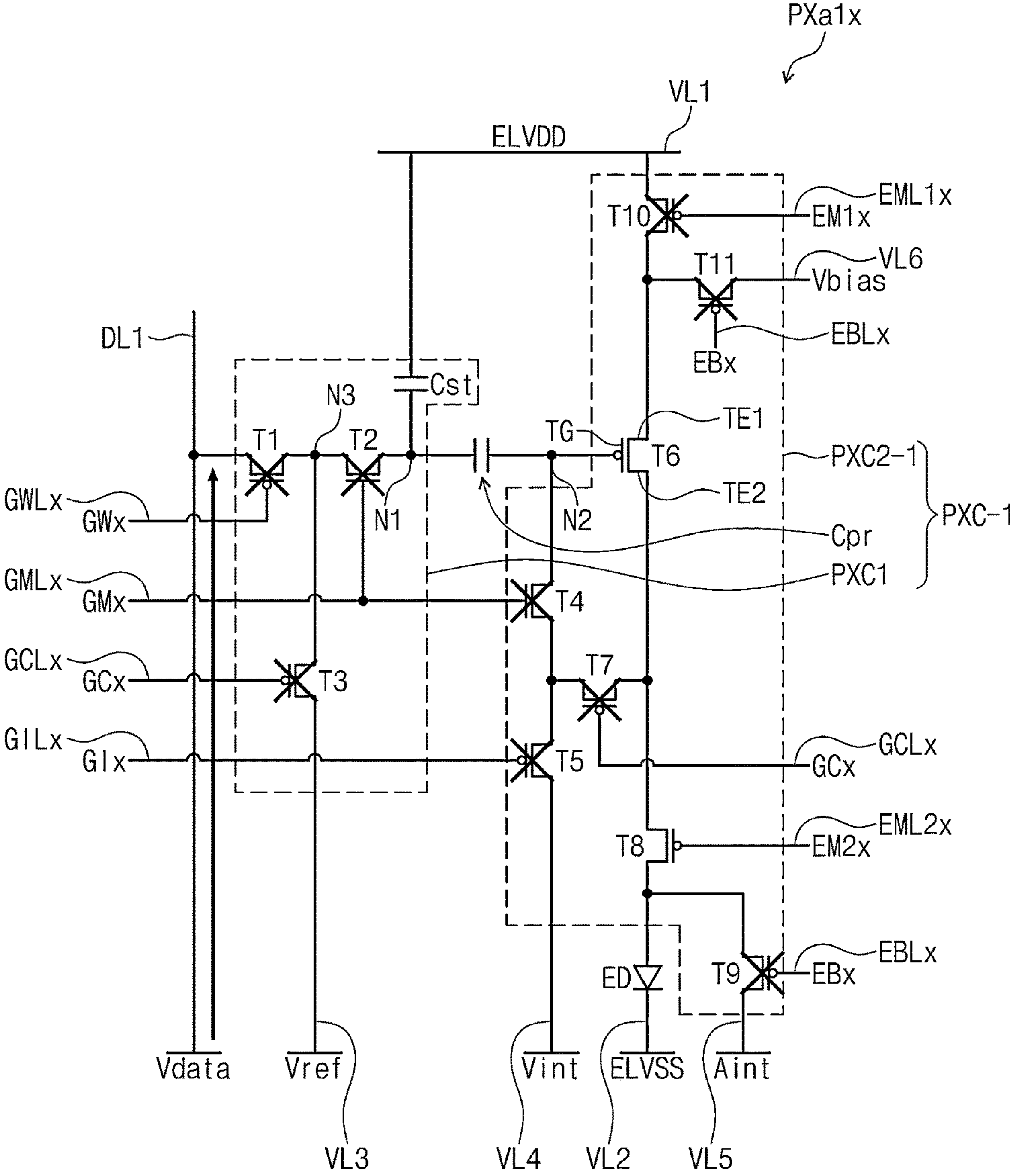
FIG. 13A illustrates a diagram showing a pixel operation in a first period depicted in FIG. 12.
Figure 13B:
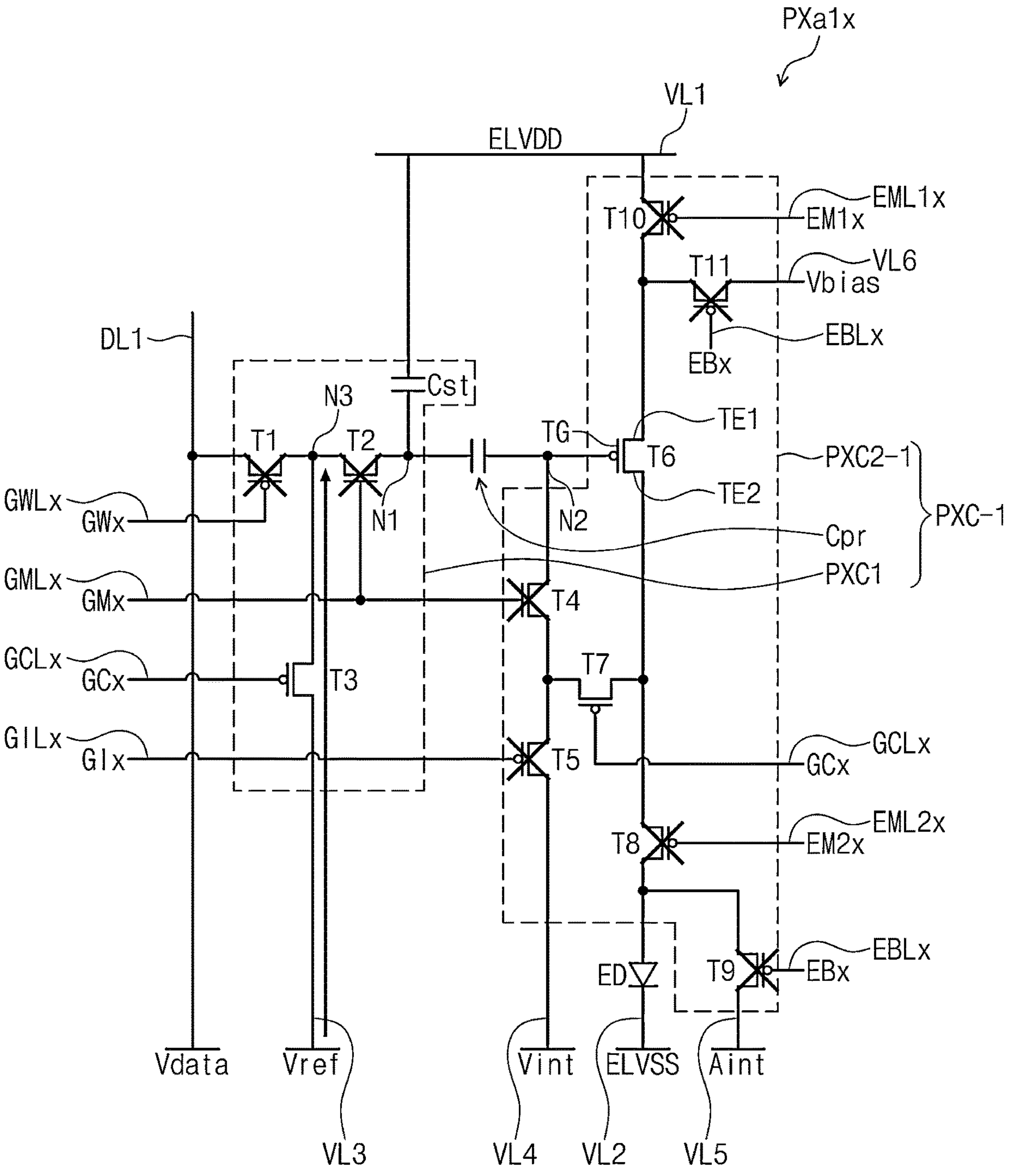
FIG. 13B illustrates a diagram showing a pixel operation in a second period depicted in FIG. 12.

FIG. 12 illustrates a waveform diagram showing an operation of pixels operated in a multi-frequency mode. FIG. 13A illustrates a diagram showing a pixel operation in a first period SC1a-1 depicted in FIG. 12. FIG. 13B illustrates a diagram showing a pixel operation in a second period SC2a depicted in FIG. 12.

Referring to FIGS. 12, 13A, and 13B, when the display (see DP of FIG. 3) operates in the multi-frequency mode MFM, the first pixel PX1-1 may be provided with an $(x-1)^{th}$ initialization scan signal GIx-1, an $(x-1)^{th}$ compensation scan signal GCx-1, an $(x-1)^{th}$ masking scan signal GMx-1, an $(x-1)^{th}$ write scan signal GWx-1, an $(x-1)^{th}$ bias scan signal EBx-1, an $(x-1)^{th}$ first emission control signal EM1x-1, and an $(x-1)^{th}$ second emission control signal EM2x-1. When the display panel (see DP of FIG. 3) operates in the multi-frequency mode MFM, the second pixel PX2 may be provided with an $x^{th}$ initialization scan signal GIx, an $x^{th}$ compensation scan signal GCx, an $x^{th}$ masking scan signal GMxa, an $x^{th}$ write scan signal GWxa, an x' bias scan signal EBx, an $x^{th}$ first emission control signal EM1x, and an $x^{th}$ second emission control signal EM2x.

A frame depicted in FIG. 11 may be a full frame in which data is written to the first pixel PX1-1 and the second pixel PX2-1, and a frame depicted in FIG. 12 may be a partial frame in which data is written to the first pixel PX1-1 and previously written data is maintained in the second pixel PX2-1. The partial frame may be a data write frame for the first pixel PX1-1, and may be a hold frame for the second pixel PX2-1.

In the hold frame, the $x^{th}$ masking scan signal GMxa may have an inactive level (e.g., low level), and the $x^{th}$ write scan signal GWxa may have an inactive level (e.g., high level). Therefore, the data signal Vdata may be transmitted neither to the third node N3 nor to the first node N1.

In a first period SC1a-1 that corresponds to the first period SC1 of FIG. 11, the $x^{th}$ masking scan signal GMxa may have an inactive level (e.g., low level), and the $x^{th}$ write scan signal GWxa may have an inactive level (e.g., high level). Thus, in the first period SC1a-1, the data signal Vdata may not be input to the second pixel PX2-1.

In a second period SC2a, the $x^{th}$ masking scan signal GMxa may have an inactive level (e.g., low level), and the $x^{th}$ compensation scan signal GCx may have an active level (e.g., low level). In the second period SC2a, the third node N3 may be initialized to the reference voltage Vref. Afterwards, as both of the $x^{th}$ first emission control signal EM1x and the $x^{th}$ second emission control signal EM2x are transited to an active level (e.g., low level), a current path may be formed through the tenth, sixth, and eighth transistors T10, T6, and T8 between the first drive voltage line VL1 and the light emitting element ED.

According to an embodiment of the present invention, before the light emitting element ED emits light, the reference voltage Vref may be applied to the third node N3 between the first transistor T1 and the second transistor T2. For example, in the hold frame where previous data is held, the third node N3 is initialized to the reference voltage Vref before the light emitting element ED emits light.

According to an embodiment of the present invention, in both of the data write frame and the hold frame, the third node N3 may be initialized to the reference voltage Vref before the light emitting element ED emits light. Therefore, there may be a reduction in brightness difference between the data write frame and the hold frame, and as a result, the display device (see DD of FIG. 1A) may increase in display quality.

According to that discussed above, a display panel may selectively operate in a single frequency mode or a multi-frequency mode. In the multi-frequency mode, a second transistor may be turned off which is included in a pixel disposed in a location where data signal transfer is unnecessary. Therefore, the second transistor may block the data signal transfer. In addition, in both of a data write frame and a hold frame, a node between first and second transistors may be initialized to a reference voltage before a light emitting element emits light. Therefore, there may be a reduction in brightness difference between the data write frame and the hold frame, and as a result, a display device may increase in display quality.

Although the embodiments have been described with reference to a number of illustrative examples thereof, it will be understood by those of ordinary skill in the art that various changes in form and details may be made without departing from the spirit and scope of the present invention as set forth in the following claims. Thus, the technical scope of the present invention is not limited by the embodiments and examples described above, but by the following claims.

What is claimed is:

1. A display device, comprising a display panel including a plurality of pixels, each including a pixel circuit and a light emitting element, a plurality of scan lines connected to the pixel circuit, an emission control line connected to the pixel circuit, and a data line connected to the pixel circuit, wherein the pixel circuit includes:

a first capacitor connected to a first node and a second node opposite to the first node;

a first circuit portion including a first transistor and a second transistor, the first transistor being connected between the data line and the first node, and the second transistor being connected between the first transistor and the first node; and a second circuit portion connected to the second node and the light emitting element, wherein, before the light emitting element emits light, a reference voltage is provided to a third node between the first transistor and the second transistor, wherein the first circuit portion further includes a third transistor connected between the third node and a reference voltage line to which the reference voltage is provided, wherein the second circuit portion includes a fourth transistor connected between the second node and a first initialization voltage line to which a first initialization voltage is applied, and wherein the second transistor and the fourth transistor are controlled by a same scan signal.

2. The display device of claim 1, wherein the first transistor is a p-type thin film transistor, and the second transistor is an n-type thin film transistor.

3. The display device of claim 1, wherein the first circuit portion further includes:

a second capacitor connected between the first node and a first drive voltage line to which a first drive voltage is applied.

4. The display device of claim 3, wherein the second circuit portion further includes:

a fifth transistor connected between the fourth transistor and the first initialization voltage line;

a sixth transistor including a gate electrode connected to the second node, a first electrode connected to the first drive voltage line, and a second electrode;

a seventh transistor connected between the second electrode of the sixth transistor and a node between the fourth transistor and the fifth transistor;

an eighth transistor connected between the light emitting element and the second electrode of the sixth transistor; and a ninth transistor connected between a node between the light emitting element and the eighth transistor and a second initialization voltage line to which a second initialization voltage is applied, wherein the light emitting element is connected between the eighth transistor and a second drive voltage line to which a second drive voltage is applied.

5. The display device of claim 4, wherein each of the third, fifth, sixth, seventh, eighth, and ninth transistors is a p-type thin film transistor, and the fourth transistor is an n-type thin film transistor.

6. The display device of claim 4, wherein, before the eighth transistor is turned on, the reference voltage is provided to the third node between the first transistor and the second transistor.

7. The display device of claim 4, wherein the display panel is configured to operate in a single frequency mode or a multi-frequency mode, and in the multi-frequency mode, a first portion of the display panel operates at a first frequency, and a second portion of the display panel operates at a second frequency less than the first frequency.

8. The display device of claim 7, wherein the plurality of pixels includes:

a first pixel disposed in the first portion of the display panel; and a second pixel disposed in the second portion of the display panel, wherein the second and fourth transistors of the second pixel disposed in the second portion are turned off in the multi-frequency mode.

9. The display device of claim 8, wherein the first transistor of the second pixel disposed in the second portion is turned off in the multi-frequency mode.

10. The display device of claim 4, wherein the second circuit portion further includes:

a tenth transistor connected between the first drive voltage line and the first electrode of the sixth transistor; and an eleventh transistor connected between a node between the sixth transistor and the tenth transistor and a vias voltage line to which a bias voltage is provided.

11. The display device of claim 10, wherein each of the tenth and eleventh transistors is a p-type thin film transistor.

12. A display device, comprising a display panel including a first pixel and a second pixel spaced apart from the first pixel, and which is configured to operate in a single frequency mode or a multi-frequency mode, wherein each of the first pixel and the second pixel includes a pixel circuit and a light emitting element, wherein the pixel circuit includes:

a first capacitor connected to a first node and a second node opposite to the first node;

a first circuit portion including a first transistor and a second transistor, the first transistor being connected between a data line and the first node, and the second transistor being connected between the first transistor and the first node; and a second circuit portion connected to the second node and the light emitting element, wherein, in each of the single frequency mode and the multi-frequency mode, before the light emitting element emits light, a reference voltage is provided to a third node between the first transistor and the second transistor, wherein the first circuit portion further includes a third transistor connected between the third node and a reference voltage line to which the reference voltage is provided, wherein, in the multi-frequency mode, the second transistor of the second pixel is turned off while the third transistor of the second pixel is turned on.

13. The display device of claim 12, wherein the first circuit portion further includes:

a second capacitor connected between the first node and a first drive voltage line to which a first drive voltage is applied.

14. The display device of claim 13, wherein the second circuit portion includes:

a fourth transistor connected between the second node and a first initialization voltage line to which a first initialization voltage is applied;

a fifth transistor connected between the fourth transistor and the first initialization voltage line;

a sixth transistor including a gate electrode connected to the second node, a first electrode connected to the first drive voltage line, and a second electrode;

a seventh transistor connected between the second electrode of the sixth transistor and a node between the fourth transistor and the fifth transistor;

an eighth transistor connected between the light emitting element and the second electrode of the sixth transistor; and a ninth transistor connected between a node between the light emitting element and the eighth transistor and a second initialization voltage line to which a second initialization voltage is applied.

15. The display device of claim 14, wherein, before the eighth transistor is turned on, the reference voltage is provided to the third node between the first transistor and the second transistor.

16. The display device of claim 14, wherein, in the multi-frequency mode, a first portion of the display panel operates at a first frequency, and a second portion of the display panel operates at a second frequency less than the first frequency, wherein the first pixel is disposed in the first portion, and wherein the second pixel is disposed in the second portion.

17. The display device of claim 16, wherein the second and fourth transistors of the second pixel disposed in the second portion are turned off in the multi-frequency mode.

18. The display device of claim 16, wherein the first transistor of the second pixel disposed in the second portion is turned off in the multi-frequency mode.

19. The display device of claim 14, wherein the second circuit portion further includes:

a tenth transistor connected between the first drive voltage line and the first electrode of the sixth transistor; and an eleventh transistor connected between a node between the sixth transistor and the tenth transistor and a vias voltage line to which a bias voltage is provided.

* * * * *